United States Patent
Nini

(10) Patent No.: US 10,308,496 B2
(45) Date of Patent: Jun. 4, 2019

(54) LIQUID DISPENSING TAP, PARTICULARLY FOR DISPENSING LIQUIDS WITH HIGHER DENSITIES FROM RIGID VESSELS

(71) Applicant: Vitop Moulding S.R.L., Alessandria (IT)

(72) Inventor: Diego Nini, Alessandria (IT)

(73) Assignee: Vitop Mouldings S.R.L., Alessandria (IT)

( * ) Notice: Subject to any disclaimer, the term of this patent is extended or adjusted under 35 U.S.C. 154(b) by 1 day.

(21) Appl. No.: 15/508,282

(22) PCT Filed: Sep. 4, 2014

(86) PCT No.: PCT/IT2014/000235
§ 371 (c)(1),
(2) Date: Mar. 2, 2017

(87) PCT Pub. No.: WO2016/035102
PCT Pub. Date: Mar. 10, 2016

(65) Prior Publication Data
US 2017/0247239 A1    Aug. 31, 2017

(51) Int. Cl.
*B67D 3/00* (2006.01)
*B67D 3/04* (2006.01)
(Continued)

(52) U.S. Cl.
CPC ............ *B67D 3/009* (2013.01); *B67D 3/008* (2013.01); *B67D 3/044* (2013.01); *B67D 3/046* (2013.01);
(Continued)

(58) Field of Classification Search
CPC ............ B65D 50/046; Y10T 137/7043; Y10T 137/7062
See application file for complete search history.

(56) References Cited

U.S. PATENT DOCUMENTS

| 5,687,863 A * | 11/1997 | Kusz | B65D 41/0471 |
| | | | 215/216 |
| 8,517,229 B2 * | 8/2013 | Nini | B67D 3/043 |
| | | | 137/588 |
| 2009/0301572 A1 * | 12/2009 | Nini | B67D 3/044 |
| | | | 137/315.01 |

FOREIGN PATENT DOCUMENTS

| DE | 733503 | 11/1974 |
| EP | 1975484 | 10/2008 |

(Continued)

OTHER PUBLICATIONS

International Search Report based on International Application No. PCT/IT2014/00235, dated Jun. 19, 2015—5 pages.

*Primary Examiner* — Reinaldo Sanchez-Medina
*Assistant Examiner* — Nicole Gardner
(74) *Attorney, Agent, or Firm* — McCarter & English, LLP

(57) ABSTRACT

A tap (1) is disclosed for delivering liquids, particularly for delivering high- and medium-density liquids from rigid vessels, comprising: a body (3); stem means (9); and elastic actuating means (11) of the stem means (9); air inlet/outlet means (13, 25, 28) in the body (3) and inside the vessel; valve means (7) for passing air; non-return valve means (26) placed between the air inlet and outlet means (13, 25, 28) and the vessel interior and adapted to be guided and driven by the pressure difference between outside the tap (1) and inside the vessel; anti-counterfeiting and protecting means (A); supporting means (E); and an integrated glass (D).

19 Claims, 33 Drawing Sheets

(51) Int. Cl.
*F16K 21/04* (2006.01)
*F16K 21/08* (2006.01)
*F16K 24/02* (2006.01)
*F16K 17/04* (2006.01)

(52) U.S. Cl.
CPC .............. *F16K 21/04* (2013.01); *F16K 21/08* (2013.01); *F16K 24/02* (2013.01); *B67D 3/0058* (2013.01); *F16K 17/042* (2013.01); *F17C 2223/013* (2013.01); *F17C 2223/03* (2013.01)

(56) References Cited

FOREIGN PATENT DOCUMENTS

| | | |
|---|---|---|
| WO | 2007/108025 | 9/2007 |
| WO | 2010/041286 | 4/2010 |

\* cited by examiner

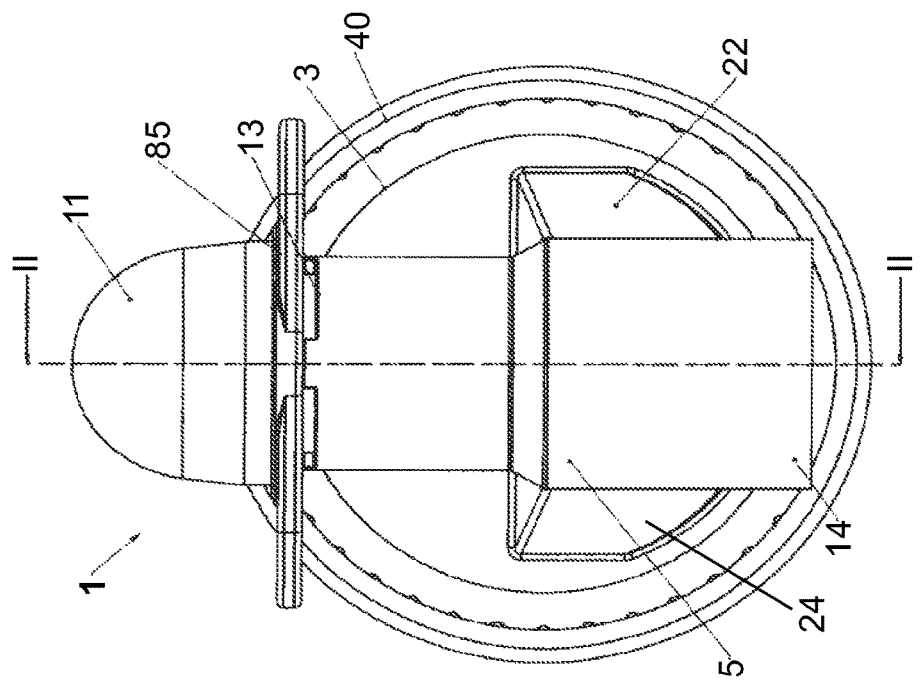
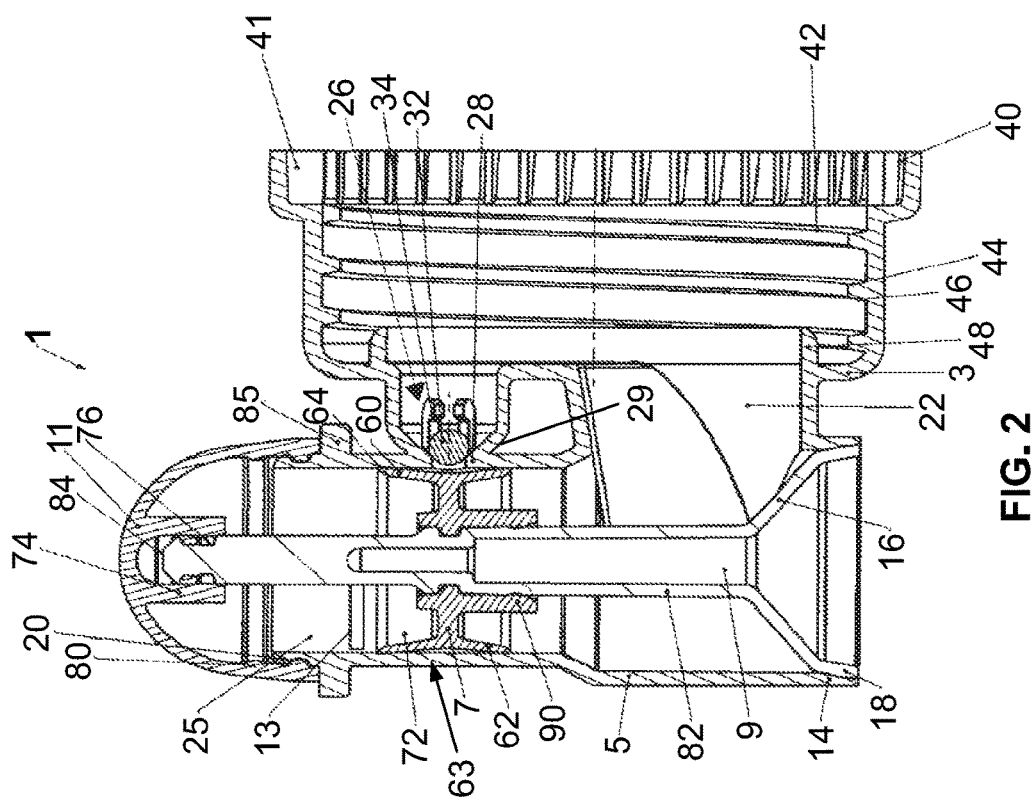

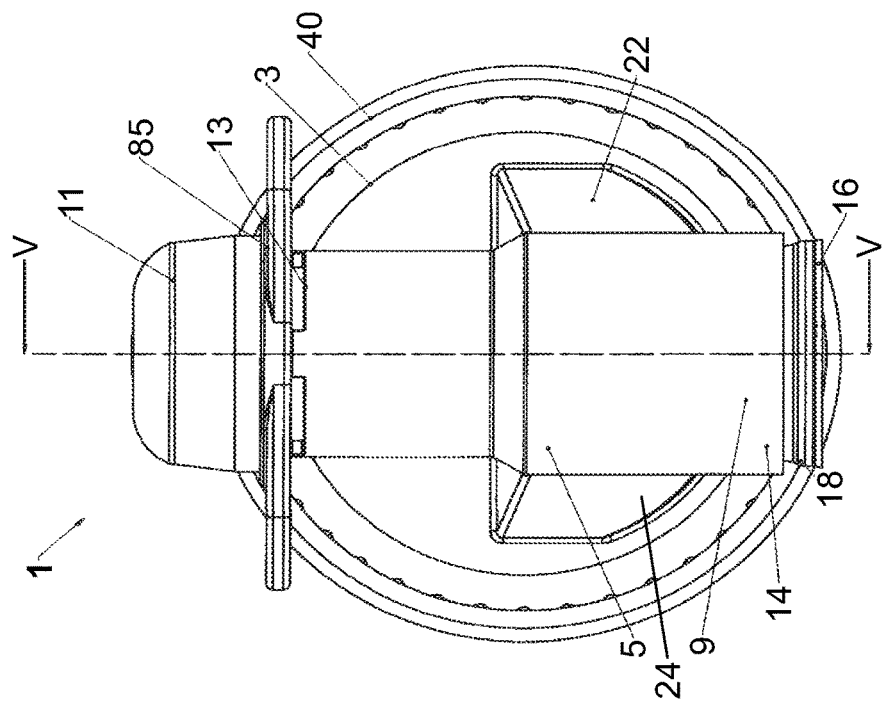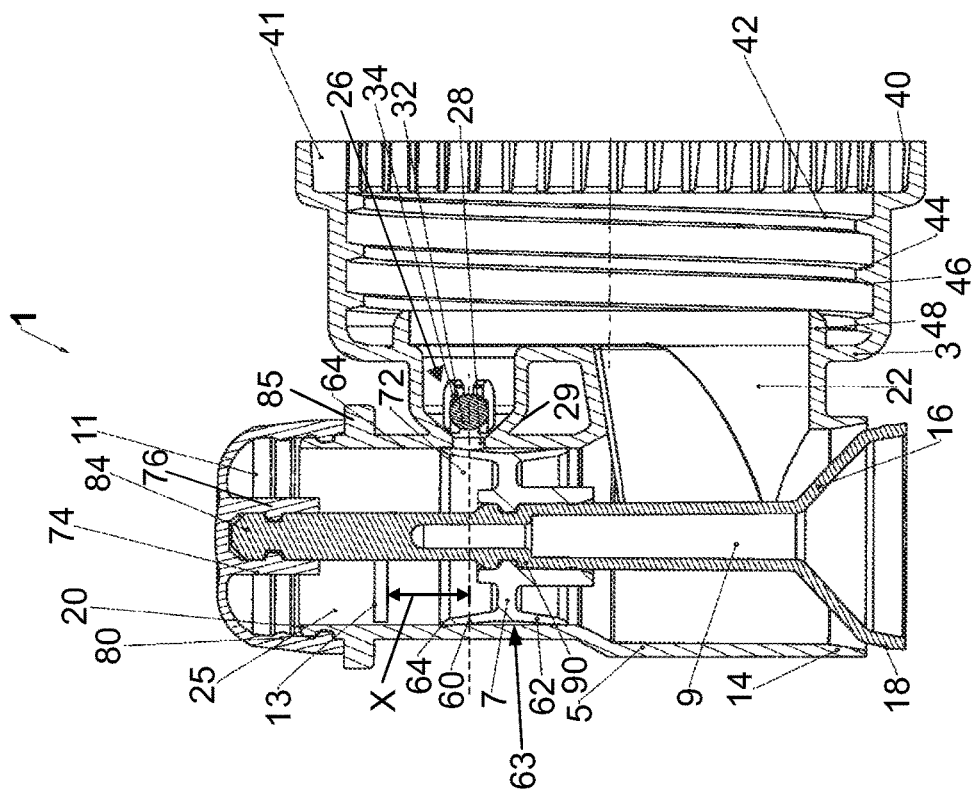

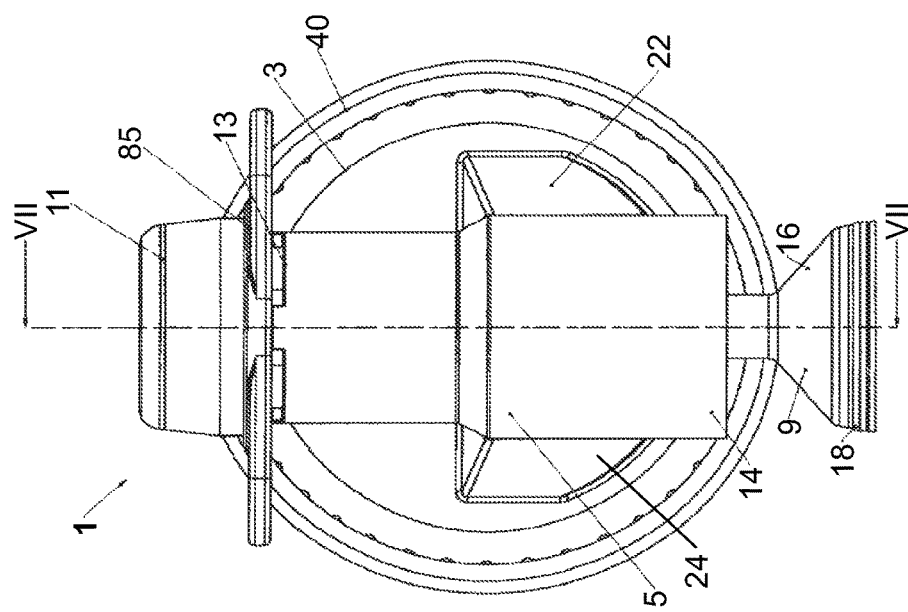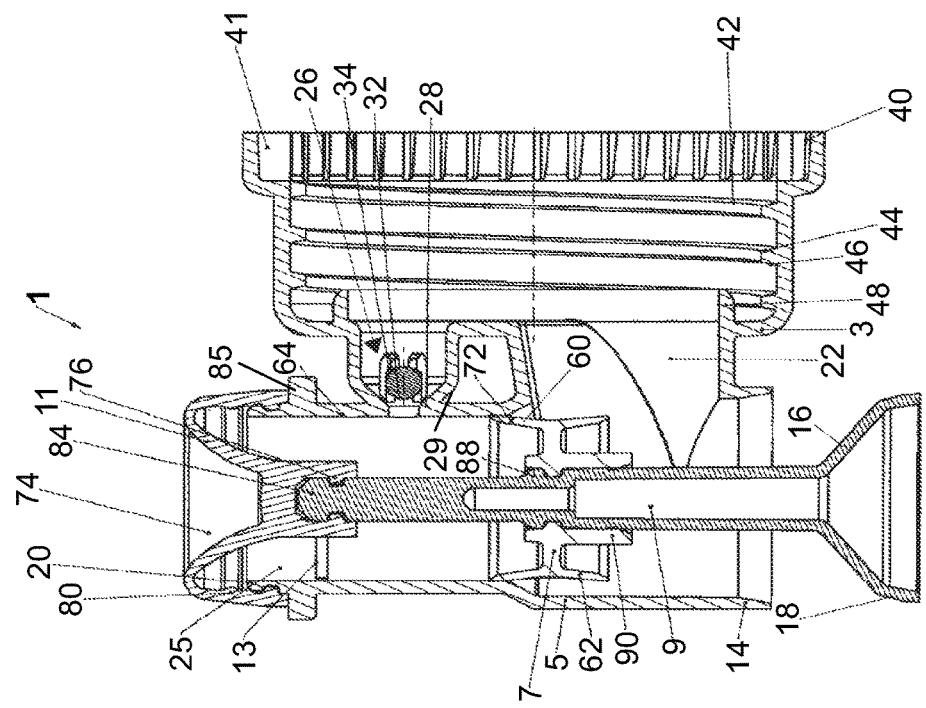

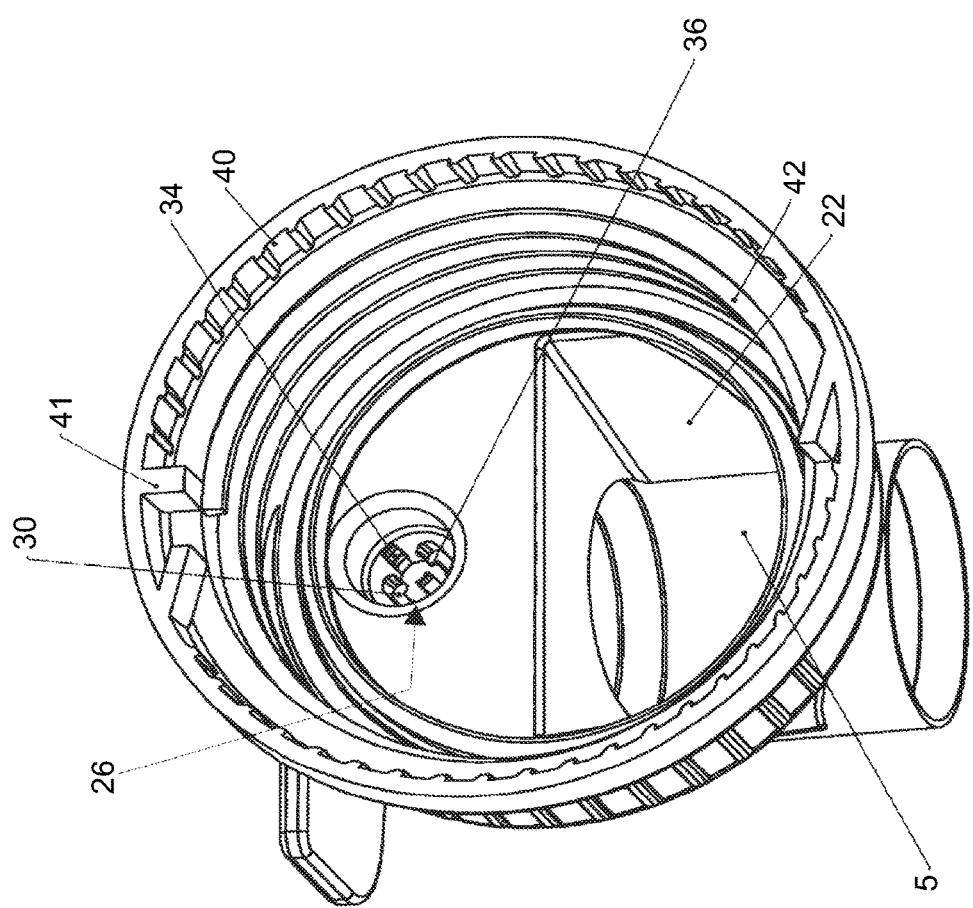

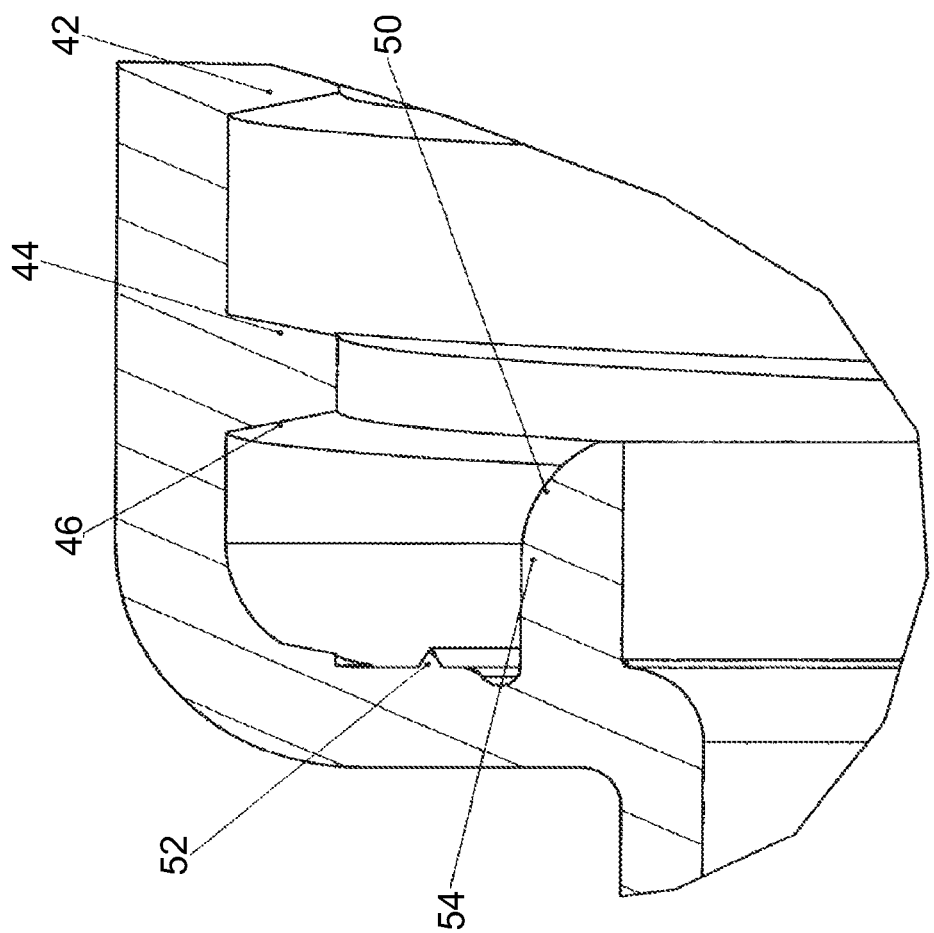

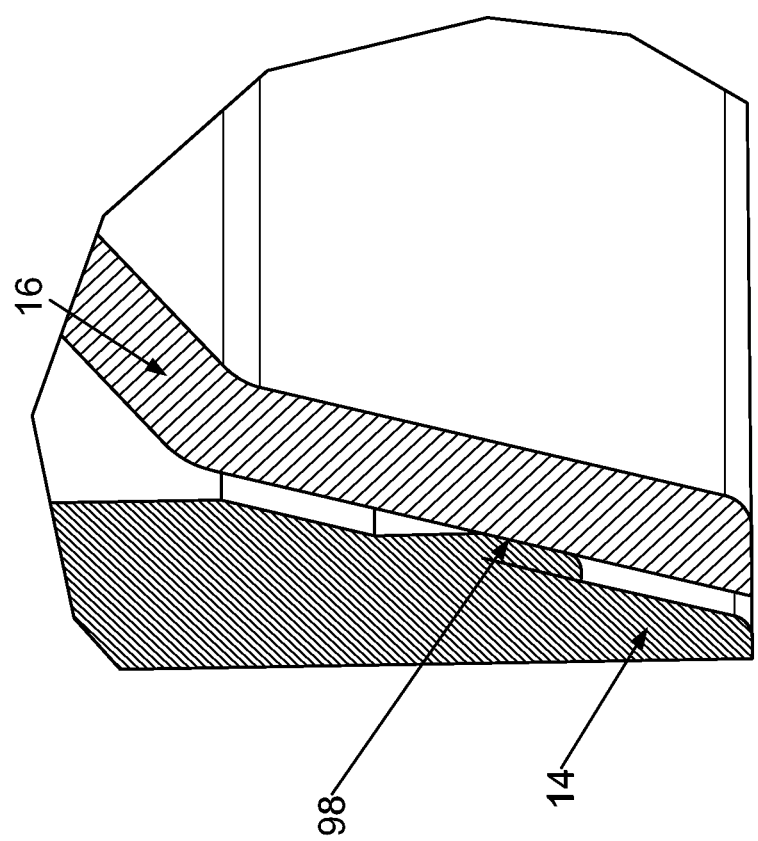

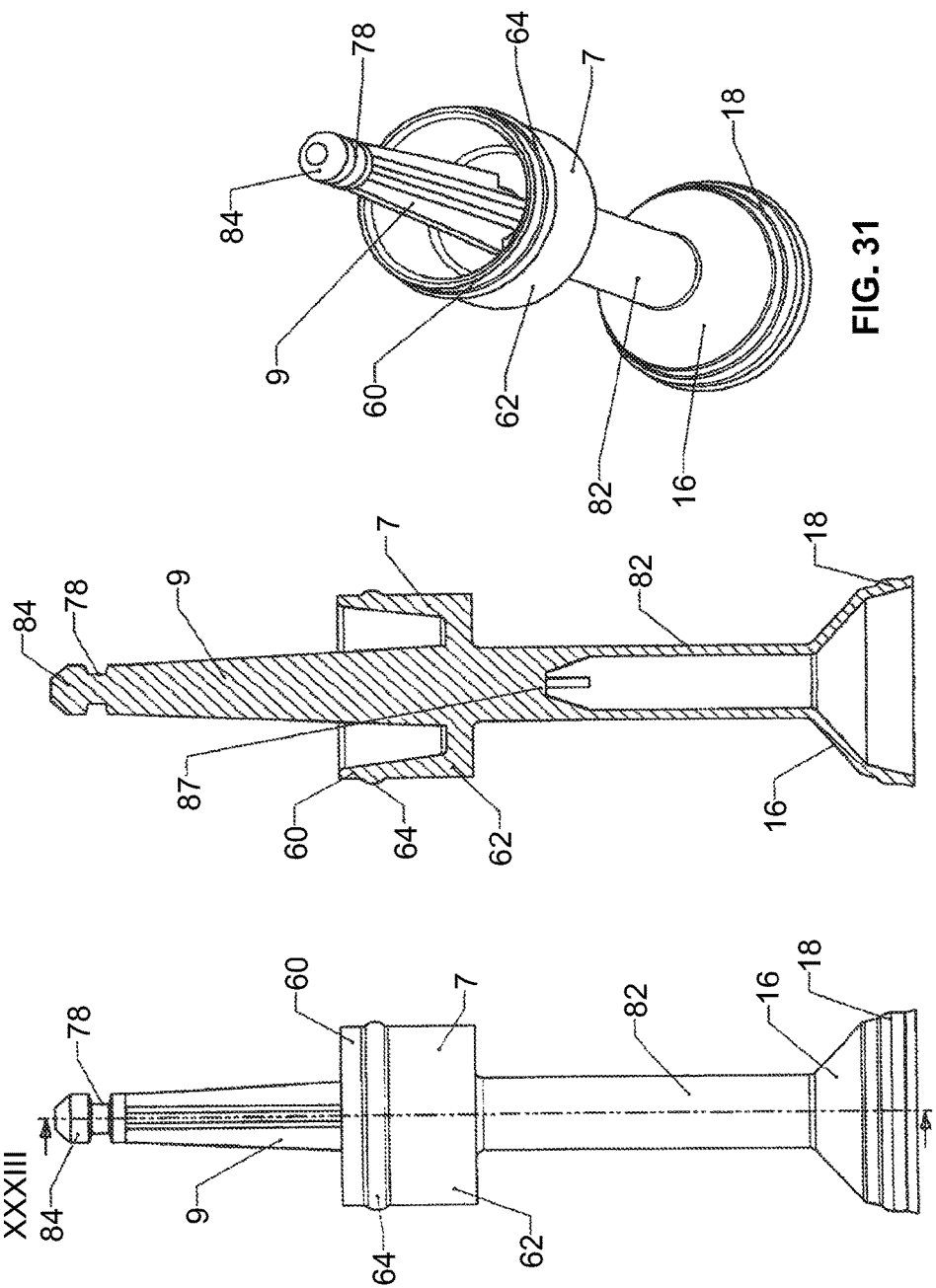

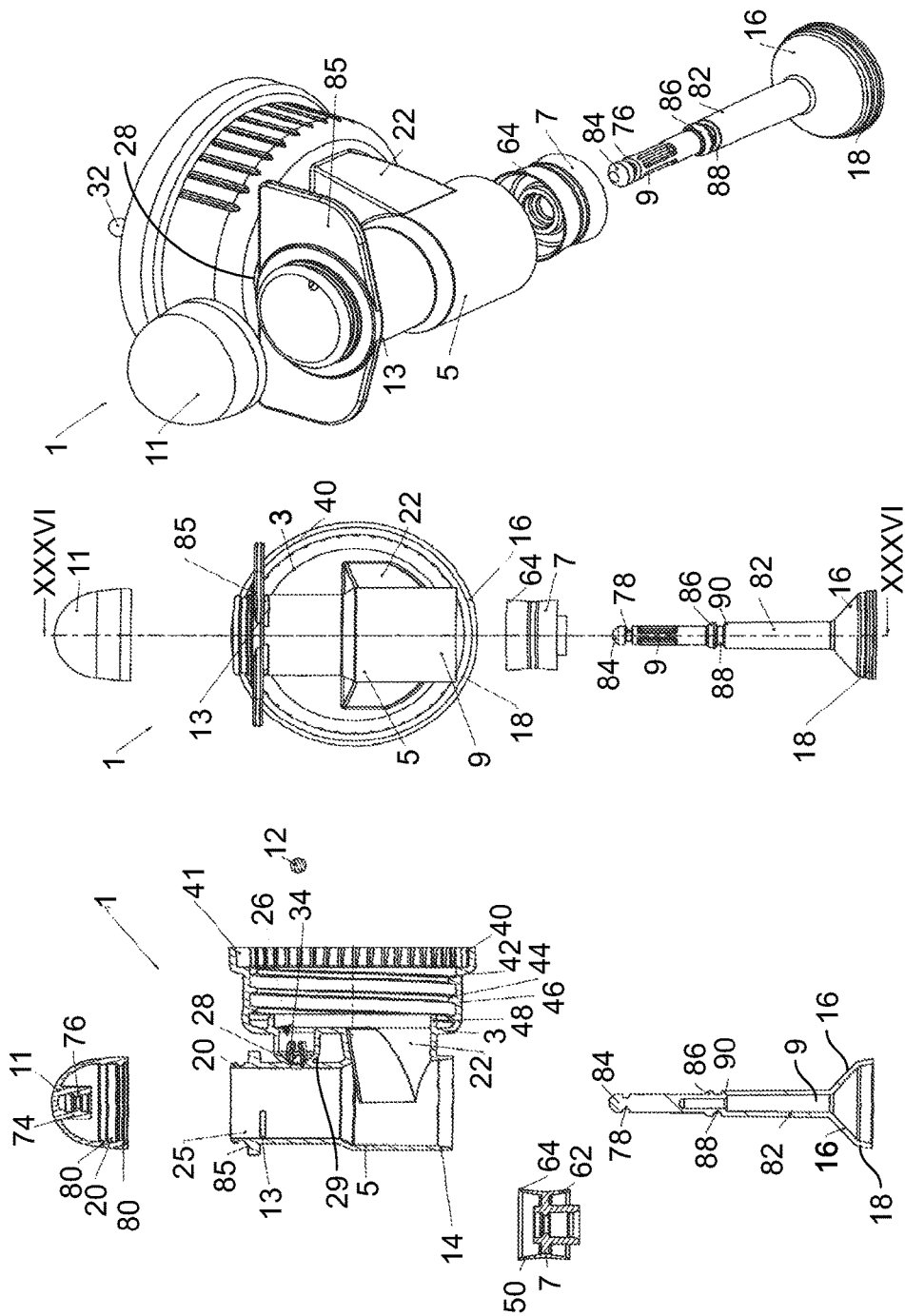

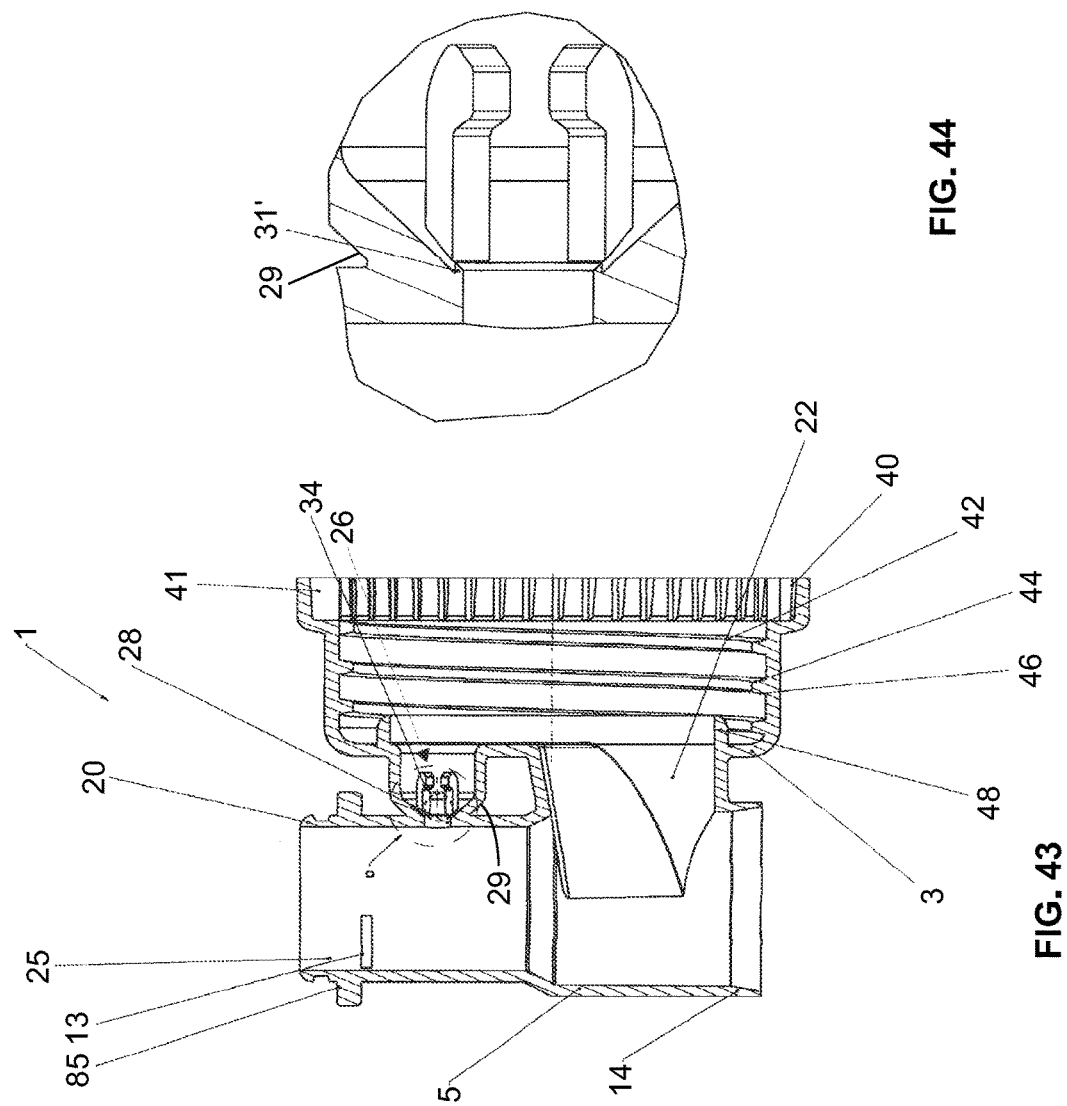

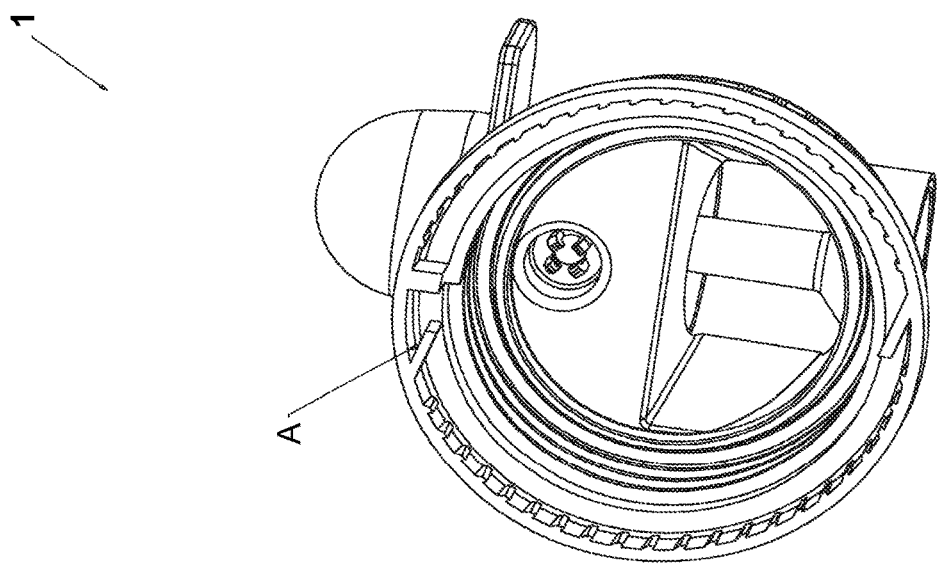

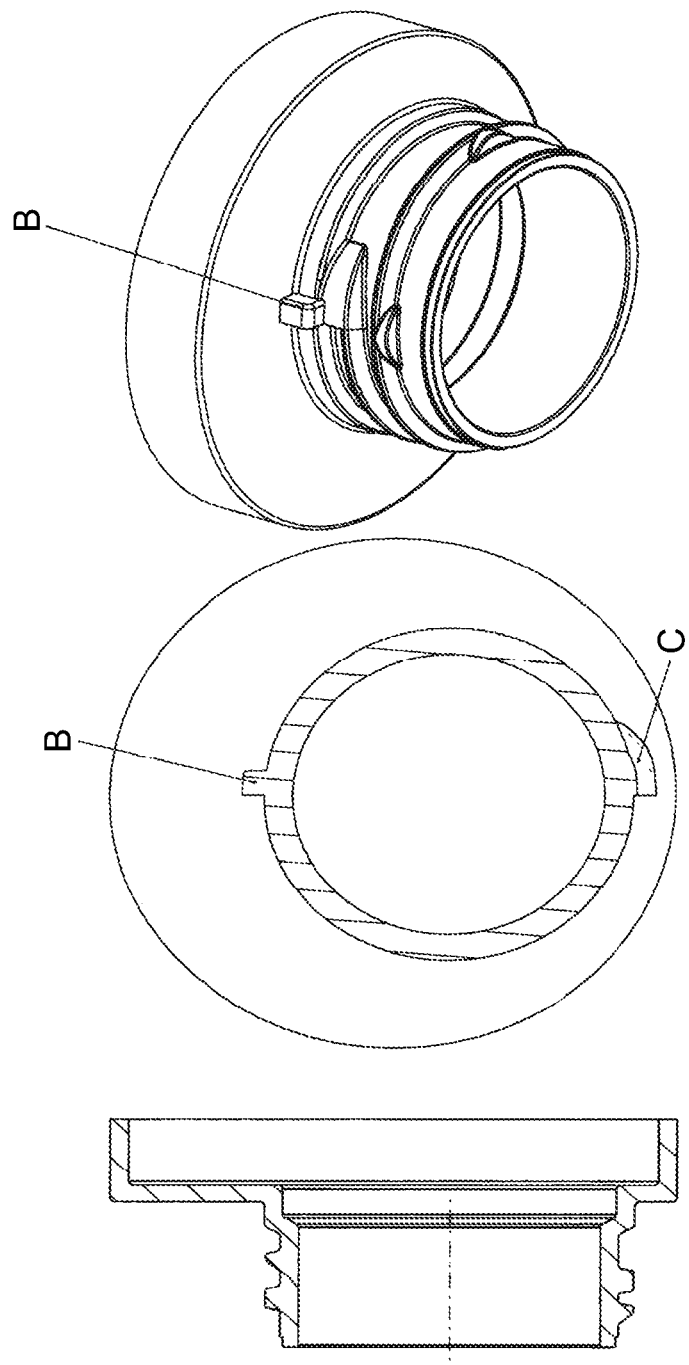

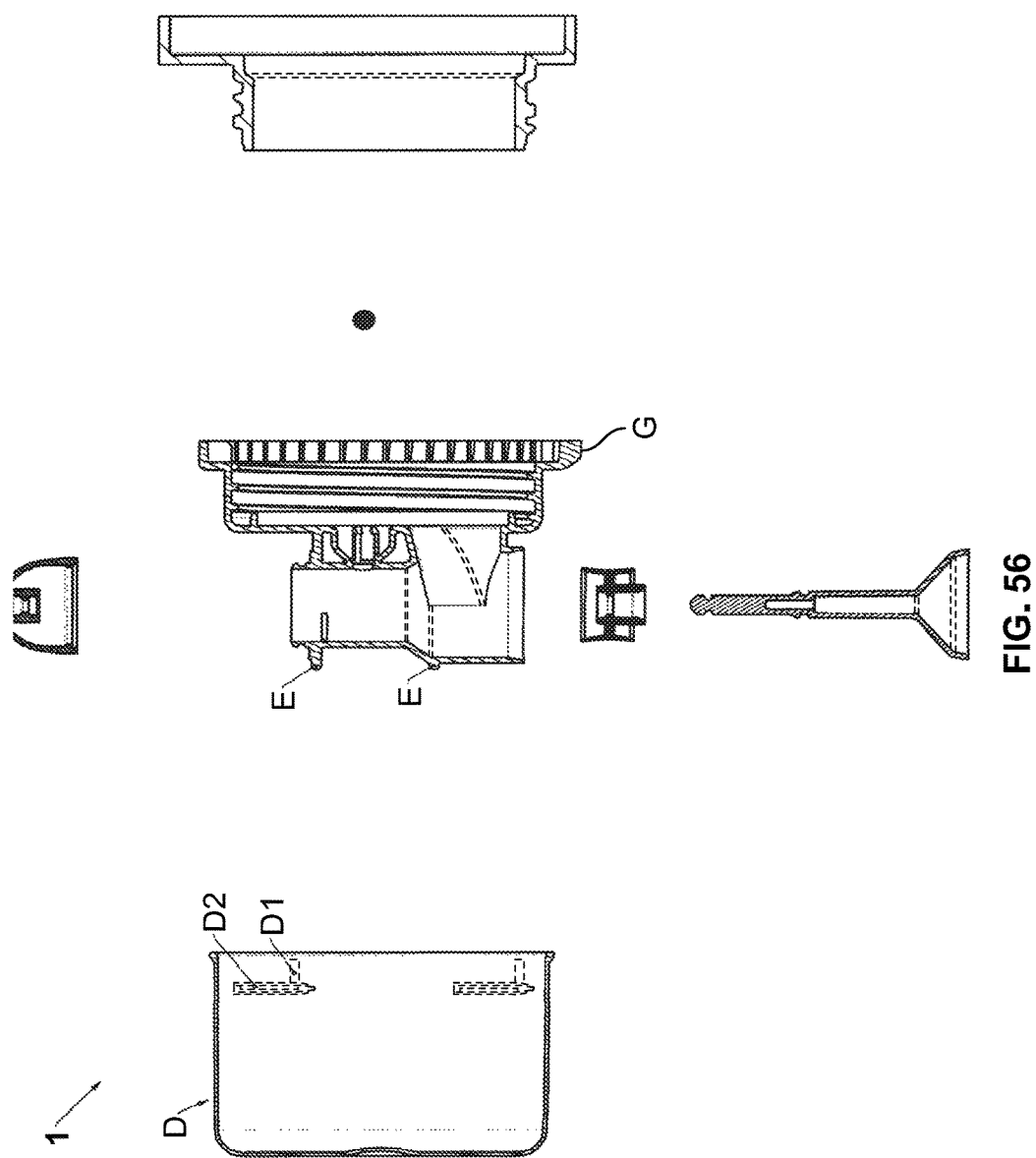

LIQUID DISPENSING TAP, PARTICULARLY FOR DISPENSING LIQUIDS WITH HIGHER DENSITIES FROM RIGID VESSELS

The present invention refers to a liquid dispensing tap, and more particularly to a dispensing tap for delivering liquids with higher densities (for example oil, detergent and the like) from rigid vessels.

The inventive tap finds a non-limiting application both to a vessel equipped with a dispensing hole, which operates as seat for the tap and filling hole of the vessel, and to a rigid vessel, in which two holes are generally obtained, one which is used for "housing" the liquid dispensing tap and the other which is used for filling the container; this second opening also operates as "air entry" during the liquid delivering step, and therefore during the normal use of the vessel, if a normal delivering tap is connected to the other hole, for example lacking the arrangement of EP-A1-2377830: this when and if the production cycle provides first the insertion, or screwing, of the tap and then the filling of the other hole.

In these cases, for the majority of products being present on the market, the second hole (namely the one which in the production cycle will be closed by means of a "normal" tap) also operates as air inlet when using the tap (in practice the second hole is made remain on the top, when using, with respect to the tap, giving the chance to the user of being able to open it in order to make air go in and therefore in order to prevent that such vacuum is created inside the vessel, which inhibits the use of the tap itself).

In the prior art, in this first case, numerous problems occur:
- very complex and costly machines must be created for filling and inserting the plug (first the tap must be inserted, then filling must be done from the other hole, and then this latter hole must also be plugged with another plug or vice versa);
- very costly containers must be created (since they have a very complex geometry having two threaded holes, generally with different diameter size);
- the total packaging cost is high, both for assembling, and for stamping, and for filling and for creating (generally from blown parison, but also from a blown pre-form), since the product is formed of numerous parts;
- there is a high cost for transporting the already formed vessels with the tap already inserted in one of the two screwing "mouths": the number of pieces is limited and, above all, by transporting already formed vessels with a piece already assembled, de facto air will be transported (the already formed vessel has not yet been filled with liquid, and therefore the first transport will be of air only); moreover, there will be the need of performing a first step of assembling the tap onto the vessel (the second assembling step will occur in the plant where filling will be made, in order to close the second hole, namely the one that will be used for venting the vessel and above all for filling it) increasing assembling and transporting costs;
- there is a scarce understanding from the consumer, since, if he does not remember to remove the second plug to compensate for the pressures, makes the system lock;
- for vessels which have only one hole where the tap will be placed (and therefore there is not a second venting hole) there are no anti-counterfeiting or children-protecting systems, that provide safety on the tap. In this way, two dangers arise: the tap can be removed and liquid ingested by children; and the tap can be removed and the vessel filled with a different liquid (even of a lesser quality);
- the batching glass is usually a standalone piece not integrated in the tap, whose function is only leveling the surface where the tap is screwed: in practice, it protects the tap from possible distortions during its storage on pallets and above all makes the surface where the tap is placed "plane" and therefore stackable, so that vessels can be stacked one above the other.

There are on the market also other delivering taps which partly solve the above-cited problems, but for the major part keeps other or create new problems.

For example, there is on the market a first tap (described in GB-A-2333288), which is derived, as regards the pressure opening system (the so-called "press tap"), from the first tap introduced on the market (described in U.S. Pat. No. 4,452,425) to which an integrated air passage has been added.

There are many problems and they are due to the fact that the plug is coincident or adjacent with the liquid outlet. The fact that air intake and liquid outlet are coincident or adjacent and not well separated, makes it possible that a "choking" effect occurs for the air passage: in fact, by moving along the body and stem cylinder surface, generates friction which tends to slow it down. The resistance to fluid movement is applied however only to fluid particles immediately in contact with the surfaces. Therefore, the fluid will tend to adhere to the surfaces themselves, generating the famous possible "choking" of the air passage. Therefore, summarising, at least in its vertical version, the air passage could badly operate; it is further not excluded that such malfunction occurs also in the "horizontal" version, and above all when there are high- and medium-density liquids.

There is also another type of dispensing tap, which has the integrated air passage, and which is used with rigid vessels, which contain high- and medium-density liquids. Such tap is described in WO-A-2005124204. This dispensing tap, as an average, operates well, but it has the following defects:
- it has numerous parts (nine or ten), and namely cap, body, four or five O-rings, a driving member, a metal spring and a bell, many of which (such as spring and O-rings) are accessories: therefore, it is a very costly tap both when assembling, and when stamping;
- the metal spring sometimes (above all when the detergent has not correctly operated as lubricant) is not able to counteract the friction force of O-rings inside the tap body, and therefore the tap does not perfectly close, generating liquid leakages;
- O-rings are fragile and therefore are damaged shortly after their use;
- if FIG. 3 in patent WO-A-2005124204 is taken into account, where the tap opening position is pointed out, another serious problem can be noted: if for some reason a pressure is applied to the vessel (but sometimes there are also small leakages, even if no pressure is applied) which determines a pressure increase (and therefore a pressure difference between vessel exterior and interior), liquid will tend to leak out, in addition to the liquid outlet hole, also from the air inlet hole, flooding the internal chamber created in the driving member (which is also the spring seat). The liquid, once having filled-in the chamber, will overflow outside the tap. Having a pin which goes back towards the tap interior (when the tap is opened for making detergent go out), it is possible to plug the liquid outlet hole, when the tap is in its opening position, making liquid go out from the air hole (without applying any pressure on the vessel), which in turn, as mentioned above, after having filled-in the driving member chamber, will overflow outside the plug;

accessories of the O-ring and metal spring type make the tap difficult to be introduced, at the end of its working life, in a plastic material recycling cycle, since it would be necessary first of all to remove everything which is not plastic, for example the spring: unfortunately, in order to remove the spring, it is necessary to disassemble the whole tap, with a loss of time and money and with an unthinkable operation in a recycling cycle with industrial amounts;

in such taps, it can also happen, above all when there are medium- and high-density liquids, that liquid is dried on the air passage and clogs it. Especially in this type of taps, it has been possible to observe that, when the tap is closed in the hollow space included between the two O-rings which have a hole in their center, so that when the tap is opening it communicates the vessel interior with the exterior, there remains a liquid product which can be dried and can create a solid film which clogs the communication hole with the outside (present on the driving member) and in this case the tap does not correctly operate any more and flow is blocked.

For both above mentioned taps, there is no chance to be connected to a system (connector) which is used to keep the tap always open, since both taps are not provided on the air passage of a non-return valve, which prevents liquid from going out when the tap is in its opening position, due to the connector. The outlet hole is linked to a device (connector) which in turn can be connected to a pump, which drives the flow: therefore, it can happen that the tap is in an opening position but does not deliver liquid from the liquid passage, since the pump, and consequently the automatic system to which it is connected, does not require it, and therefore, without a safety valve on the air passage, liquid would go out without remedy from such passage.

Other prior taps, as mentioned above, are problematic since, not having integrated air passages, need two opposite mouths (on one the tap will be placed, and on the other a normal plug). Upon their use, the mouth opposite to the tap will be opened to make air enter into the vessel and to make no pressure differences occur between vessel exterior and interior, which would cause the flow lock from the tap. All this system (assembling, stamping and filling) is very costly.

Other prior art valve system arrangements are as follows:
GB-A-406127, in which a closing ball is provided, kept in position by a spring, differently from the innovative solution described below, in which the ball is self-driven depending on pressure difference, being the ball itself very light-weight (made for example of polystyrene (PS)) and therefore with the chance of having a very sensitive valve to even minimum pressure variations;
GB-A-886369, which exploits the weight of a bigger ball and gravity to obtain its closure;
EP-A-0633195, which exploits gravity and vessel inclination to perform its closure.

Object of the present invention is solving the above mentioned problems, by providing a dispensing tap for liquids which is equipped with anti-counterfeiting or children-protecting arrangements.

Another object of the present invention is providing a tap as described above which further has self-supporting arrangements, useful when transporting and storing, and is equipped with an integrated batching glass.

A further object of the present invention is providing a tap as described above, which is equipped with an integrated air passage and a safety valve, which is self-driven and self-controlled by pressure; such tap is especially adapted for rigid vessels, which preferably contain medium- and high-viscosity liquids.

A further object of the present invention is providing a tap as mentioned above which is adapted, with suitable and trivial modifications, for all types of vessels, also for example the so-called "Bag-In-Box", which do not need air passages, which would therefore be removed. The inventive tap is adapted to be used, optionally, with a tap covering bell, which is also used to make the vessel+tap system "regular", which otherwise would have an irregular geometry, and therefore would be difficult to store.

The above and other objects and advantages of the invention, as will appear from the following description, are obtained by a liquid dispensing tap as claimed in claim 1. Preferred embodiments and non-trivial variations of the present invention are claimed in the dependent claims.

The present invention will be better described by some preferred embodiments thereof, provided as a non-limiting example, with reference to the enclosed drawings, in which:

FIG. 1 is a front view of a preferred embodiment of the dispensing tap of the present invention in its closing position;

FIG. 2 is a sectional view performed along line II-II in FIG. 1;

FIG. 4 is a front view of the tap in FIG. 1 in a partially opened position;

FIG. 5 is a sectional view performed along line V-V in FIG. 4;

FIG. 6 is a front view of the tap in FIG. 1 in a complete opening position;

FIG. 7 is a sectional view performed along line VII-VII in FIG. 6;

FIG. 8 is a perspective rear view of the tap in FIG. 1;

FIG. 16 is a detailed view of a further variation of the connection part of the inventive tap;

FIG. 24 is a detailed view of the coupling area between stem and tap body in FIG. 22, with the stem being present;

FIG. 31 is a perspective view of a further variation of the inventive tap stem;

FIG. 32 is a front view of the stem in FIG. 31;

FIG. 33 is a sectional view performed along line XXXIII-XXXIII di FIG. 32;

FIG. 34 is an exploded, summarising perspective view of the tap in FIG. 1;

FIG. 35 is an exploded front view of the tap in FIG. 34;

FIG. 36 is a sectional view performed along line XXXVI-XXXVI di FIG. 35;

FIG. 43 shows a side sectional view of another variation of the inventive non-return valve with a small lip;

FIG. 44 is a detailed view of the valve in FIG. 43;

FIG. 46 shows the rear view of the inventive tap, where the integration of the second small flexible lip is pointed out, which will engage the standard neck present on the market;

FIGS. 47, 48 and 49 are the front, side and sectional views of the standard neck with which children-protecting arrangements are engaged, with double small flexible lip;

FIG. 56 shows the exploded sectional view of the tap of FIG. 55;

Figure 3:
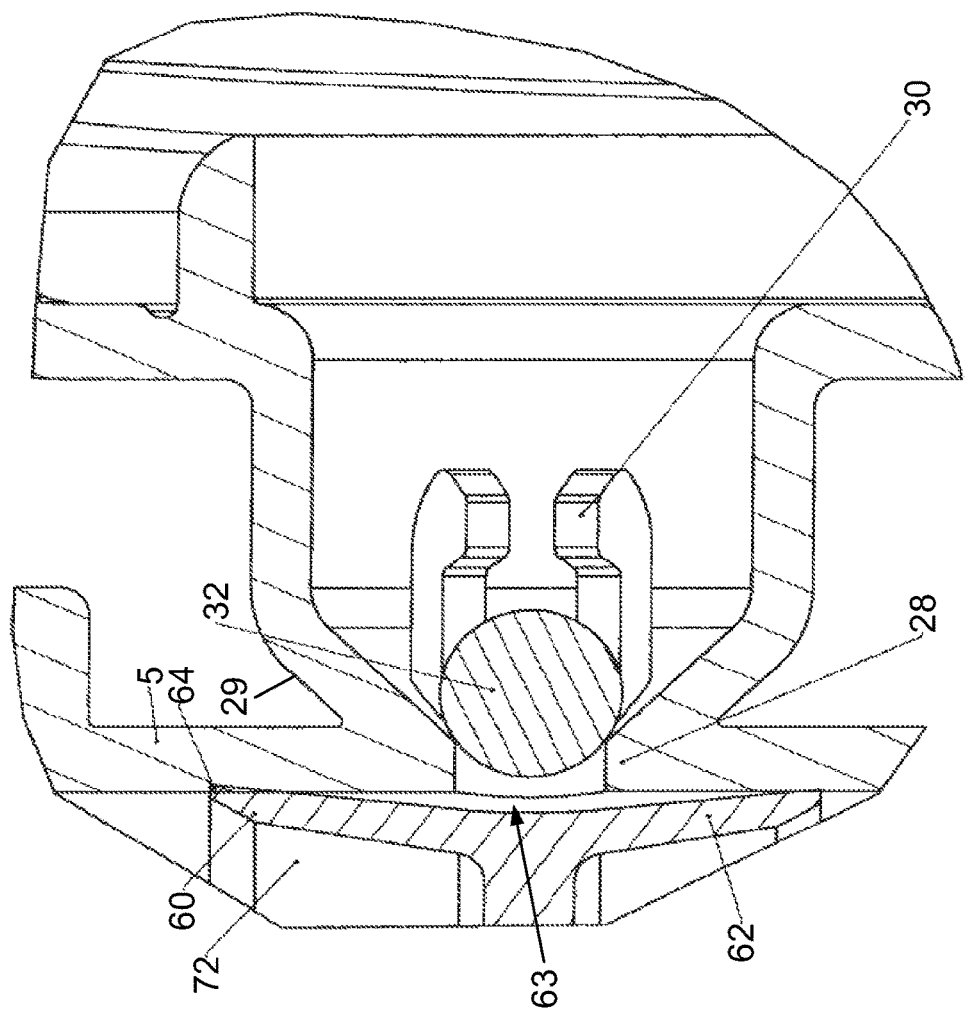
FIG. 3 is a detailed view of the valve part of the tap in FIG. 2.

With reference to the Figures, a preferred embodiment of the liquid dispensing tap of the present invention will be shown and described below. It will be immediately obvious to the skilled people in the art that numerous variations and modifications (for example related to shape, sizes and parts with equivalent functionality) can be realised for the described tap, without departing from the scope of the invention, as defined by the enclosed claims.

With reference to the Figures, a preferred embodiment of the dispensing tap 1 for liquids of the present invention is described, in its vertical application. It will be immediately evident that the inventive tap 1 can also be realised in its horizontal version, with minimum updates, which are evident for a common technician in the field.

The tap 1 first of all comprises a body 3, having the following main features:

a. it is made in a single piece made of plastic material, on which a front cylinder 5 is obtained, where a sealing valve 7 slides, which is joined to the moving stem 9, which in turn is joined to the upper spring member 11;

b. on the front part of the body 3, the air inlet hole 13, or similar variations, is obtained;

c. the lower part 14 of the body 3 is internally shaped with an outline which is preferably with a slanted wall, which will allow the lower part of the stem 9 (whose lower part 16 is made with a self-centring frustum-of-cone geometry) to be coupled and perform the liquid seal.

Figure 19:
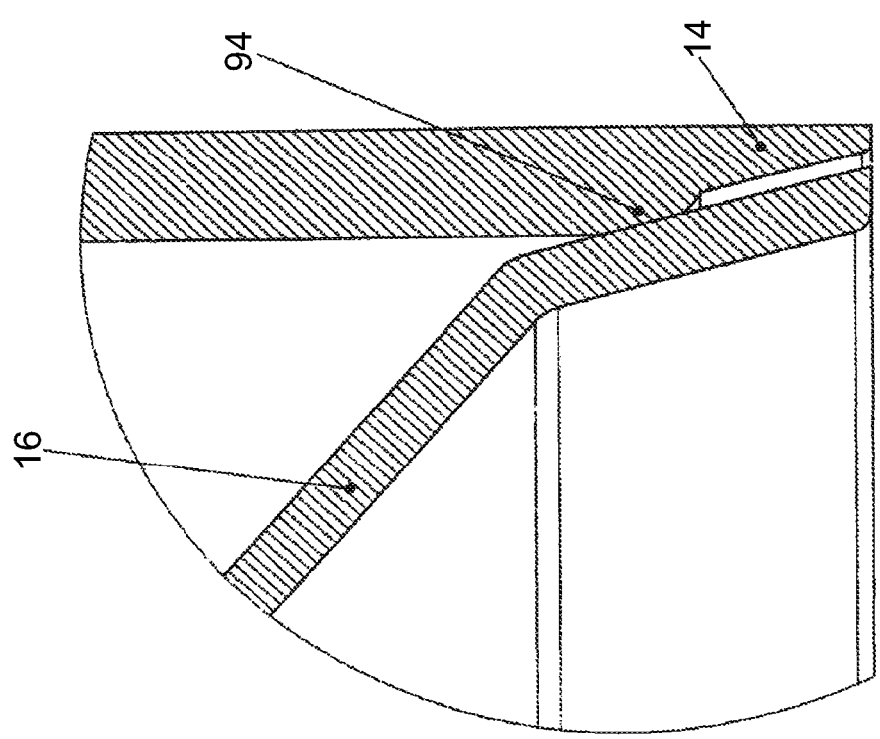
FIG. 19 is a detailed view of the seal between stem and body tap of FIG. 1.
Figure 21:
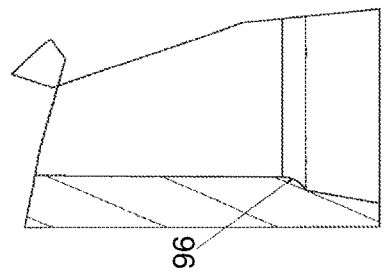
FIG. 21 is a detailed view of the coupling area between stem and tap body in FIG. 20.
Figure 20:
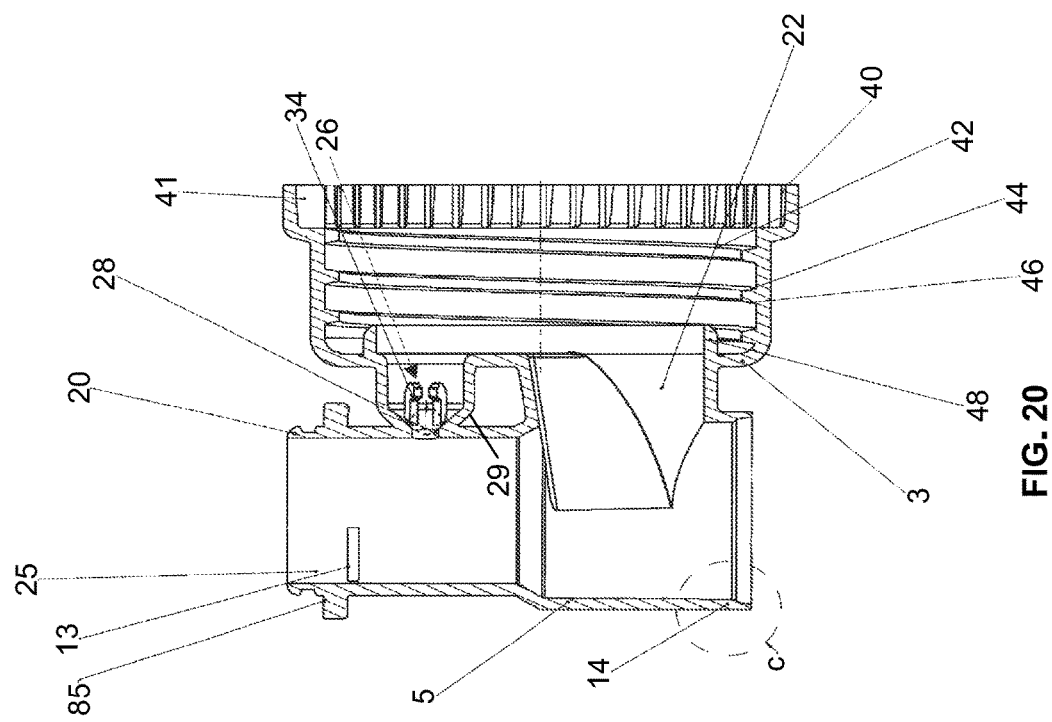
FIG. 20 is a sectional view of a variation of the inventive tap body.
Figure 23:
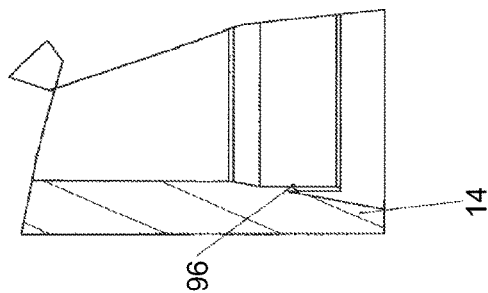
FIG. 23 is a detailed view of the coupling area between stem and tap body of FIG. 22.
Figure 22:
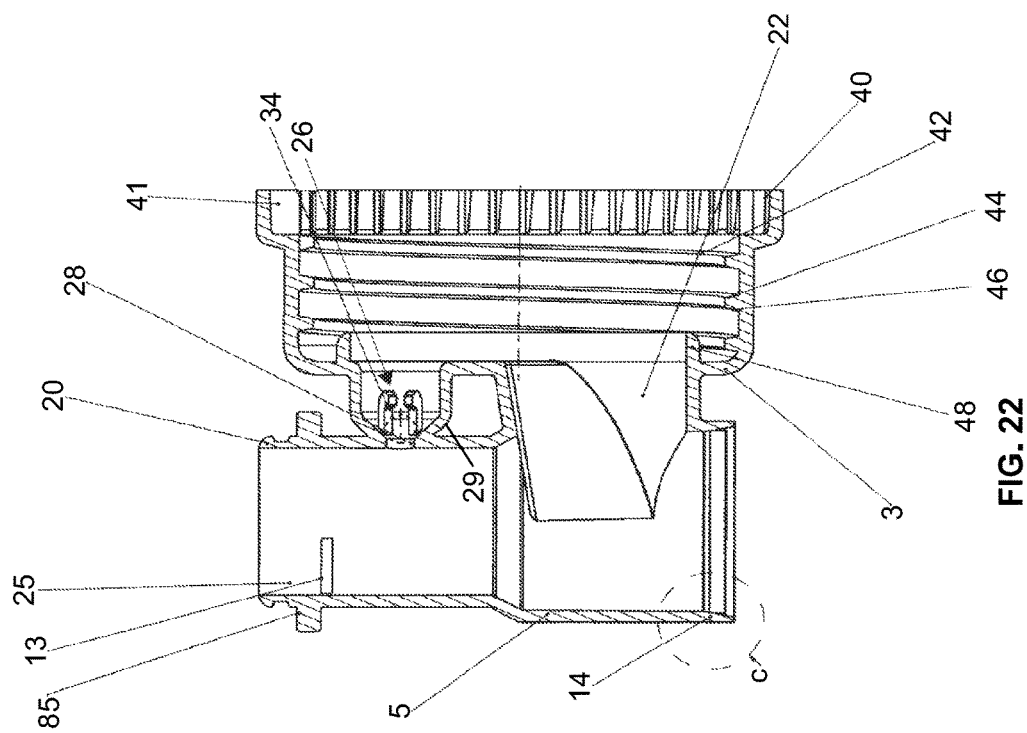
FIG. 22 is a sectional view of another variation of the inventive tap body.
Figure 25:
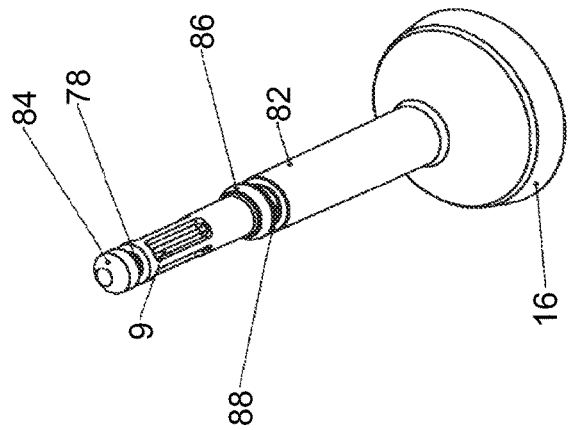
FIG. 25 is a perspective view of a variation of the inventive tap stem.
Figure 27:
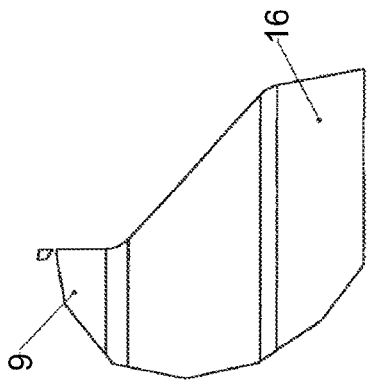
FIG. 27 is a detailed view of part of the stem in FIG. 26.
Figure 26:
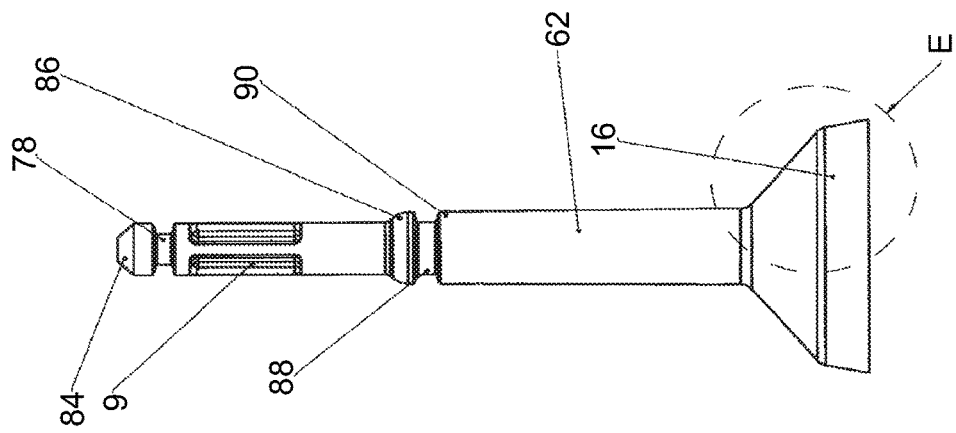
FIG. 26 is a front view of the stem in FIG. 25.

As regards still item c, FIGS. 19, 21 and 23 show three possible profiles of the body 3, adapted to realise coupling and sealing with the lower part 16 of the stem 9: particularly, FIG. 19 shows the case in which the external surface of the lower part 16 is smooth and seals the circular protuberance 94 with which the lower part 14 (in the drawings) of the body 3 is internally equipped, FIG. 21 shows the case in which inside the lower part 14 another coupling protuberance 96 is obtained, and FIG. 23 shows the case in which the lower part 14 is internally equipped with a small lip 98 which will be coupled with the external smooth surface of the lower part 16 of the stem 9, which will have a specific inclination so that the small lip best cooperates with the stem and performs a perfect coupling, possibly "compensating" for possible lacks of centring or imperfections of the stem (as can be better seen in FIG. 24).

Instead, FIGS. 25 to 27 and 28 to 33 show, among the others, two possible different profiles of the lower part 16 of the stem 9: the two profiles are respectively smooth (FIGS. 25 to 27) and of a ball type (FIGS. 28 to 33), this latter one made so that it forms an external concentric protuberance 18 which will engage the internal smooth wall of the cylindrical part 5 of the body 3. It is also possible to create another alternative, namely a flexible small lip similar to the geometry in FIG. 23, but placed on the stem wall: obviously, in this case, it will be necessary to have the smooth wall on the body (not shown).

On the upper part of the sliding cylinder 5 of the valve 7, namely the part where the dome-shaped member which mainly operates as return spring member 11 will be engaged, there is a small lip 20 which will be mechanically bent (or bent on a die or an assembling machine) in order to create a starting point for assembling the internal sealing valve 7, which otherwise would be damaged on the sharp edge being created when stamping. In fact, by bending the small lip 20, the sharp edge moves towards the outside and does not need the sealing geometry of the internal valve 7 (creating a sort of starting point for assembling). As an alternative, by modifying the pressing system, small lip 20 and riveting with rounded geometry could be removed, but the die would become more complex and costly and therefore this is not the preferred solution, even if it is technically possible.

Figure 13:
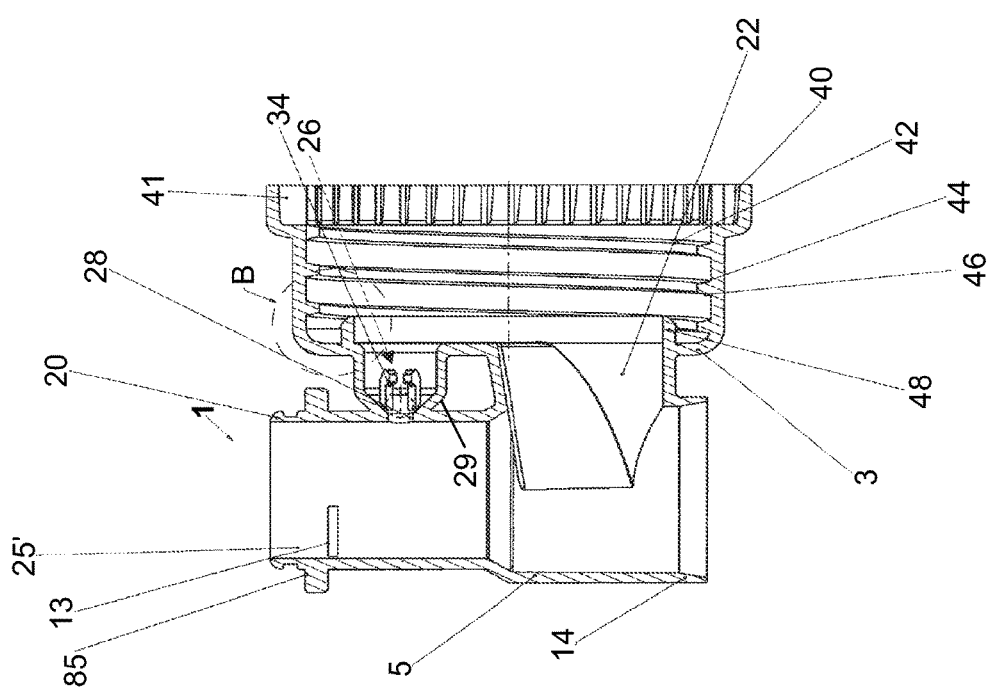
FIG. 13 is a sectional view of the inventive tap, which shows a variation of the connecting part to a vessel.

Always with reference to the body 3 of the inventive tap 1, by examining now the threaded area, which is adapted to be coupled with the vessel (not shown) containing liquid to be delivered, it is possible to see the area of the two channels for liquid and for air: they are suitably geometrically structured in order to give an absolute prevalence to the liquid outlet, since the liquid passage 22 is realised as big as possible, and is preferably equipped with slanted walls to make liquid conveyance easier. The air duct position depends on the position of the front air hole 13 and on the geometry of the chosen valve 7, as will be seen below. The height X (shown only in FIG. 13 simply in order not to complicate all other figures in which it can be found) will allow obtaining an opening delay of the air hole 13 with respect to the lower part 14 for delivering liquid in order to create a liquid prevalence and a vacuum inside the vessel which will correctly operate a liquid non-return safety valve 26, which is one of the main characteristics of the present invention. The other main characteristic is the delayed opening of the tap, which will allow the tap itself, due to vacuum, to correctly operate even without the ball-type safety valve.

The non-return safety valve 26 is placed downstream of the air duct 28 with respect to the air entry direction inside the vessel body. The duct 28 communicates with the air chamber 25 placed inside the cylinder 5 of the body 3 and which is equipped with the hole 13. The duct 28 ends with a conical profile 29 in order to realise a seal with the ball 32 of which the non-return valve 26 is composed. Such valve 26 is further substantially composed of a plurality of small teeth 30 made of a particular geometry, namely a chamfered end 34 which makes it easy on one hand to insert the ball 32 inside the small teeth (which are a sort of cage inside which the ball 32 is placed so that it can be moved from an opening to a closing position of the air flow). In the chamfered end 34, a stop edge 36 is further provided, which is adapted to keep the ball 32 between the small teeth 30, once having inserted therein the ball 32 itself. As final practical embodiment, the small teeth 30 can be made of an elastic material in order to insert therein the ball 32 at the end of manufacturing the non-return valve 26, or, as variation, the small teeth 30 can be realised as straight small teeth, which then, in order to block the ball 32, are hot riveted or mechanically bent. It is the shaping (shape) of the small teeth 30, together with the use of an adequate plastic material, which determines the resiliency of the small teeth 30 themselves.

In the Figures, the small teeth 30 are always made with a horizontal geometry, but it is clear that, with a particular stamping process, a slanted seat (not shown) could be obtained for the non-return valve 26, which would advantageously allow having, in a rest position, always the ball 32 in a closing position against the conical sealing geometry 29 obtained on the body 3.

The shown non-return valve 26, in its embodiment with a cage of small teeth 30, which are flexible or not, and with the ball 32 could also be realised in a separate piece and adapted to other existing taps on the market.

The ball 32 can be replaced, with suitable adaptations of a general geometry of the various pieces, with a stem (better shown in FIG. 45) or other pieces, which allow the system to operate as a valve. It must further be provided to give an abutment to the ball 32 with the addition of a piece which will be engaged on the body, next to the air channel through geometric adaptations (not shown). As shown below, equivalent embodiments are possible as a variation, in which the ball 32 is replaced by a mushroom 31 and by a membrane (not shown).

The peculiarity of such non-return valve 26 is that it is self-driven by the pressure, self-guided by the small teeth profile and self-lubricated by the liquid (such lubrication is also provided when stamping, adding to the plastic material a sliding agent which will make sliding easier): in fact, it will usually act, once having created vacuum inside the vessel with respect to the outside, by going back and freeing the hole (in this case the outside air will also enter inside the vessel); such valve 26 will also operate in reverse, namely in case of pressure inside the vessel, it will make the ball 32, self-guided by the small teeth, impact onto the conical profile and immediately close the air duct, avoiding to flood the upper area of the tap 1 (air zone), but conveying all pressurised liquid to the liquid outlet.

The body 3 of the tap 1 thereby has a part 40 which will contact the liquid vessel, and which must realise a perfect seal with the vessel itself. On such part 40, at least one reference member 41 is made, which determines the correct position of the tap 1 on the vessel, cooperating with similar reference members placed on the vessel itself.

As regards the securing and placing process between vessel and tap, but not of seal between liquids, the part 40 can be made of various shapes, some non-limiting ones of which are shown in the enclosed drawings. In general, the threading can simply be created by a thread 42 with the support of two geometries 44 and 46, which cooperate with other geometries (not shown) which are present on the vessel neck and make the tap stop in the right position.

As regards instead the liquid seals between tap and vessel, in addition, further sealing options can be realised. Particularly, as can be seen in FIGS. 1 to 8 and in detail in FIG. 16, an internal sealing cylinder 48 equipped with a starting surface 50 can be provided, in which the sealing cylinder 48 also cooperates with at least one triangular concentric projection 52: in this embodiment, the cylinder 48 engages the vessel neck and the projection 52 pushes on the vessel neck nose.

Figure 14:
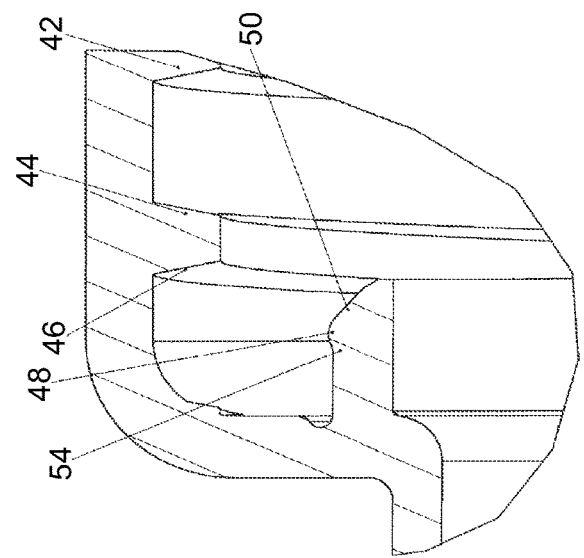
FIG. 14 is a detailed view of the connecting part of FIG. 13.

Alternatively, as shown in FIG. 14, the sealing cylinder 48 can be equipped with a sealing protuberance 54 and can be geometrically shaped in such a way as to flex in contact with the vessel body and to be automatically adapted to possible size differences from vessel to vessel.

Figure 15:
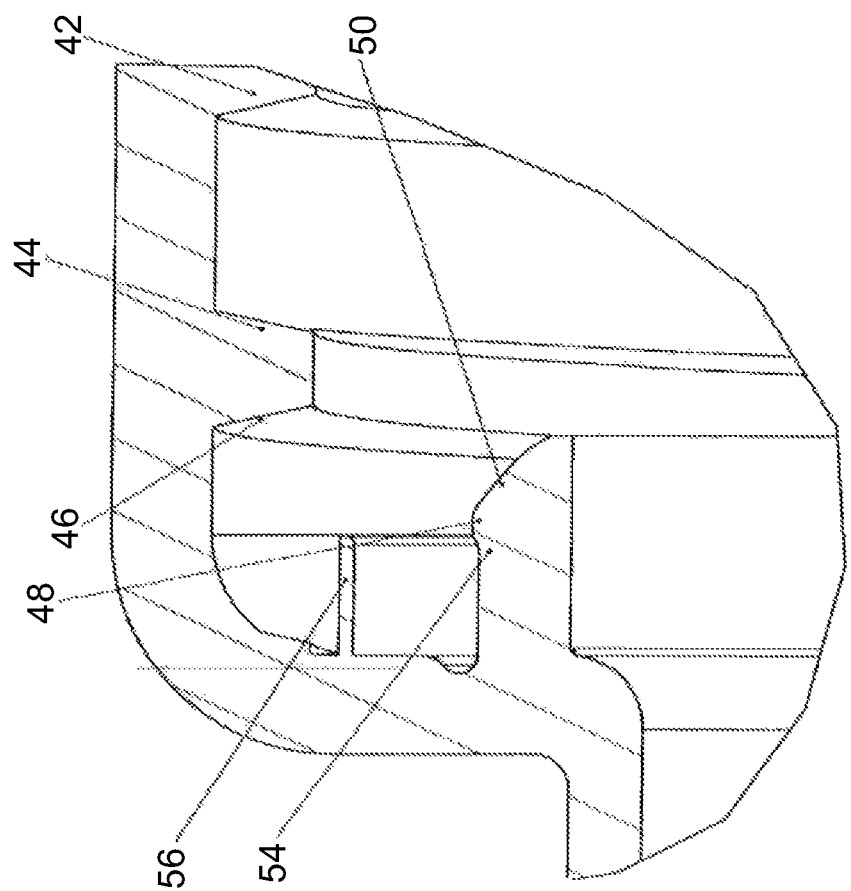
FIG. 15 is a detailed view of another variation of the connecting part of the inventive tap.

Further alternatively, as shown in FIG. 15, the configuration of FIG. 14 can be associated with a thin small lip 56, which fits to the vessel neck inside, increasing thereby the seal.

Figure 18:
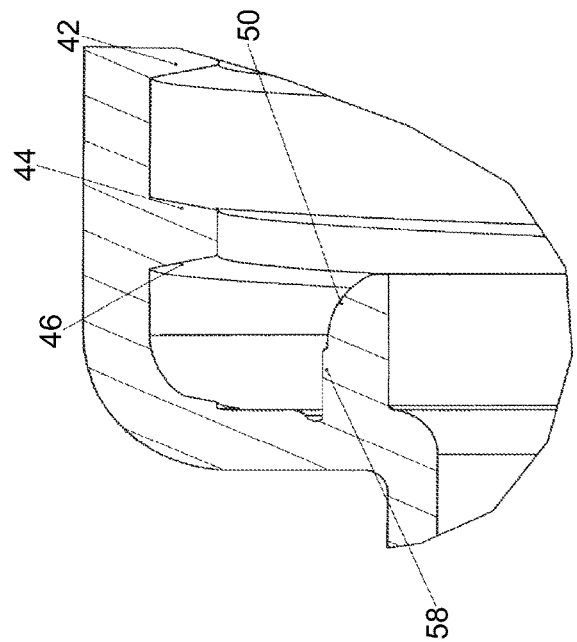
FIG. 18 is a detailed view of the connecting part of FIG. 17.
Figure 17:
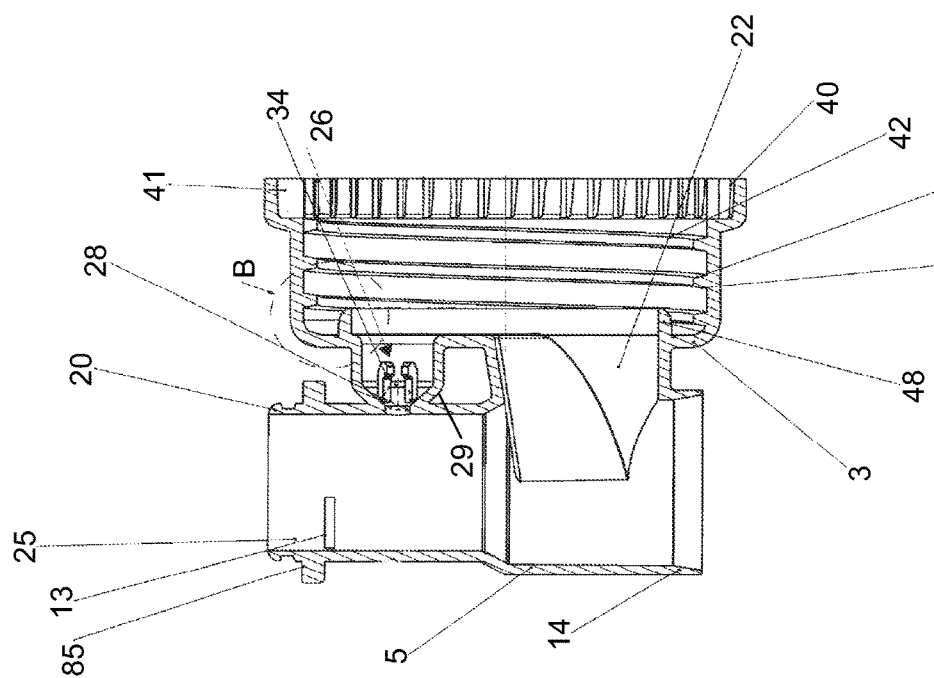
FIG. 17 is a sectional view of the inventive tap, which shows another variation of the connecting part to a vessel.

As further alternative, as shown in FIG. 18, an enlargement 58 can be provided for the sealing cylinder 48 in its upper part (in the Figure), so that it performs a simple interference with the vessel body.

As another alternative, not shown, in order to guarantee the seal between tap 1 and vessel, at least one, and preferably three threading sectors (as pointed out with reference 37 in document IT-A-TO2004A000749 of the same Applicant of the present invention) can be created, which are adapted to allow rotating the tap 1 around the vessel neck: such sectors are adapted to the type of threading which can be found on the neck itself, and, upon screwing, follow the threading itself, and therefore allow simulating the same screwing movement performed by a normal plug, for example till they snap on an undercut provided on the vessel neck. In this case, once having anchored the tap 1 to the vessel neck, there will be the feature of being able to go on rotating around the tap 1 screwing direction, and the threading sectors will again start following the thread till a sector "jumps" the vessel threading and then allows repeating the rotation, with nothing happening to the tap 1, since everything is already anchored on the vessel neck. In this way, the tap 1 can be oriented in the best position decided by the user.

As can be understood by the above mentioned examples, it is obvious that other shapes and geometries can be provided, which guarantee the perfect liquid seal between tap 1 and vessel, all these shapes and geometries falling within the scope of the present invention.

Figure 9:
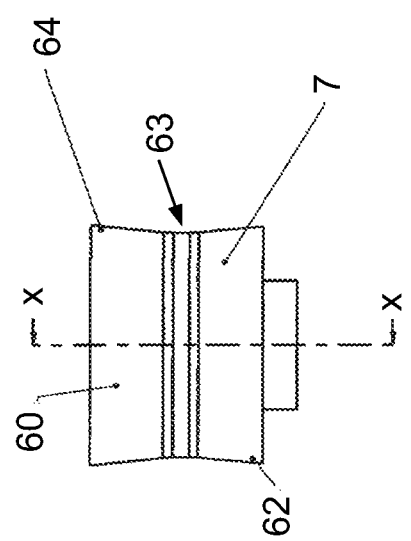
FIG. 9 is a front view of an embodiment of the closing and sealing valve member of the inventive tap.
Figure 10:
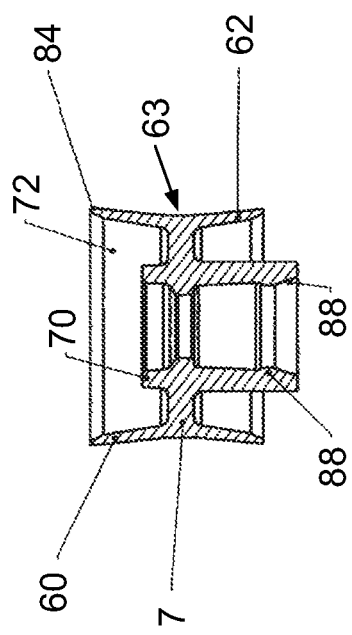
FIG. 10 is a sectional view performed along line X-X in FIG. 9.
Figure 11:
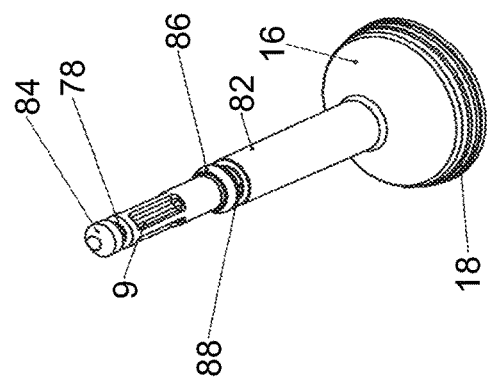
FIG. 11 is a perspective view of an embodiment of the stem of the inventive dispensing tap.
Figure 12:
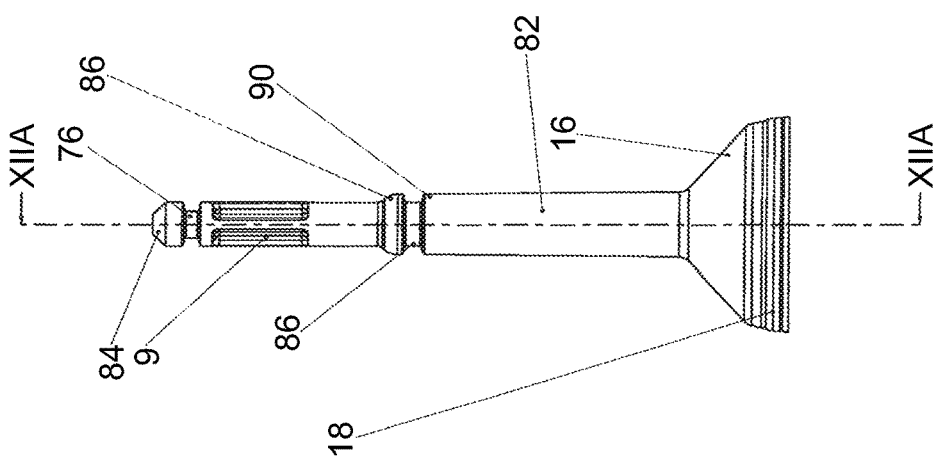
FIG. 12 is a front view of the stem in FIG. 11.
Figure 12A:
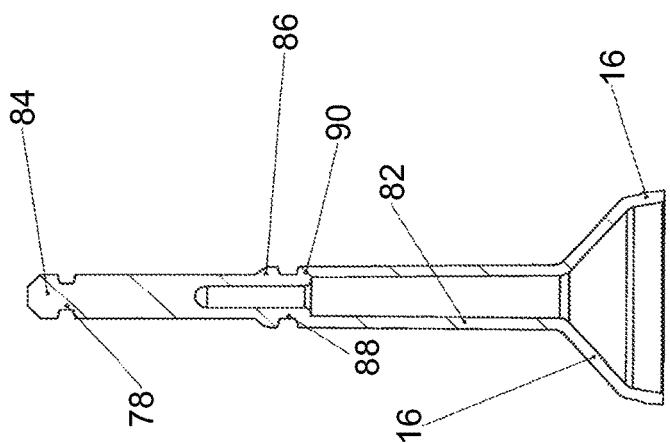
FIG. 12A is a sectional view performed along line XIIA-XIIA in FIG. 12.

As regards the internal valve 7, in the standard arrangement shown particularly in FIGS. 9 and 10, it is stamped in a semi-rigid material which allows simultaneously having the requirements of stiffness and flexibility in some of its points; also here, during the stamping step, a sliding agent can be added, which is then used to allow the piece to have less sliding friction in the body cylinder.

Particularly, the upper lip 60 is flexible, to compensate for possible non-axial movements of the stem 9 and to always provide the right "pull" in the sealing area.

The lower lip 62 is also flexible for compensating and dampening possible non-axial movements (it operates as guide being present on the stem, differently from other taps being present on the market, which have guides always on the body): such geometry operates as self-centring member for the stem 9 during its sliding, namely when opening and closing operations of the tap 1 are performed. The external area of the valve 7 has a self-lubricating hollow space 63 and a sealing area 64 (and therefore an air-liquid partitioning area), which, being always inserted in the liquid, never dries, as instead occurs in the previously proposed arrangements, and which cooperates with the body 3 in its cylindrical part 5.

The engagement area with the stem 9 has a starting chamfer 66 for centring on the stem 9, a sealing projection 68 on the stem 9 and a clamping projection 70 which allow clamping stem 9 and valve 7.

A safety trap 72 is finally provided, which is used for keeping possible material leaks.

As regards the upper spring member 11, which operates as return spring, various geometries are obviously provided, in addition to the dome one shown. In the Figure, it can be noted that such member 11 is equipped with clamping means 74 of the stem 9, equipped with at least one clamping projection 76, which is adapted to engage a corresponding recess 78 obtained in the upper part of the stem 9; and the member 11 is further equipped with sealing means 80 on the body 3, composed of a special geometry adapted to engage a corresponding sealing recess 85 obtained outside the cylindrical part 5 of the body 3.

As regards the stem 9, it can also be made of various geometries and arrangements, in order to better suit it to applications. As shown in the non-limiting embodiments o FIGS. 11 to 12A, and 25 to 33, it is equipped with an elongated body 82, which ends at one end with a sealing tooth 84 with the upper member 11 and at the opposite end with the frustum-of-cone self-centring lower part 16 already shown, equipped with a smooth profile or with a ball-shaped sealing profile 18. Along the elongated body 82, a sealing seat with the valve 7 is provided, which is preferably composed of a tooth 86 and a recess 88, in addition to a liquid sealing area 90 which cooperates with the lower part of the valve 7.

Figure 28:
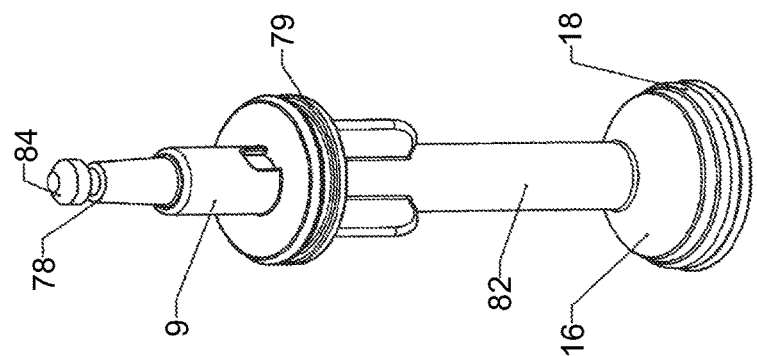
FIG. 28 is a perspective view of another variation of the inventive tap stem.
Figure 30:
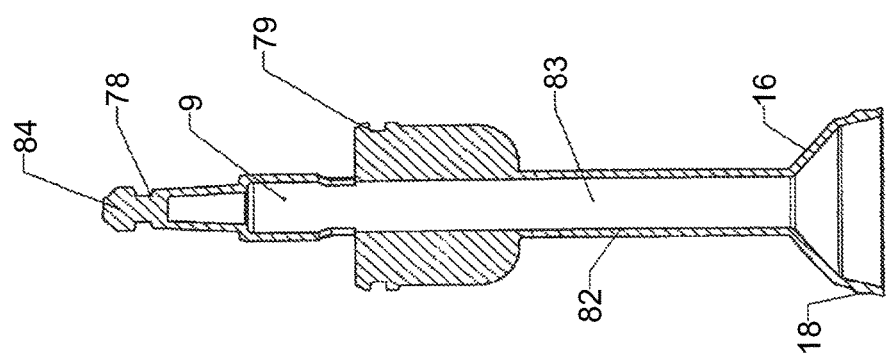
FIG. 30 is a sectional view performed along line XXX-XXX di FIG. 29.
Figure 29:
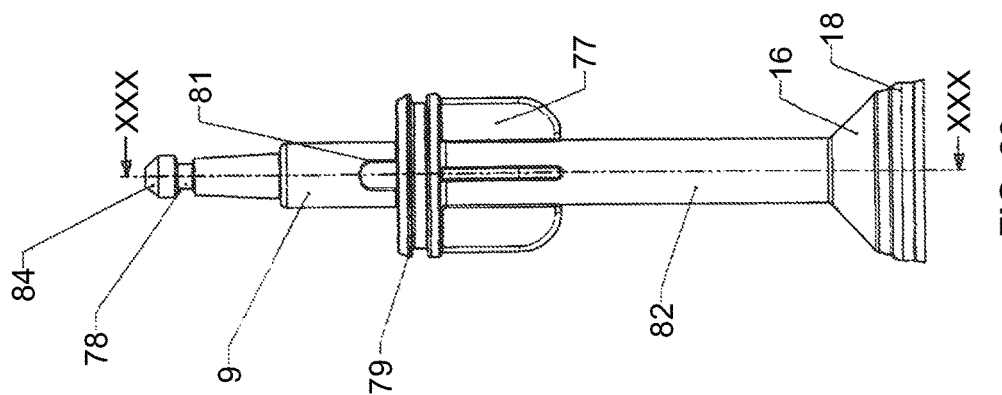
FIG. 29 is a front view of the stem in FIG. 28.

In particular, FIGS. 28 to 30 show a first variation of the stem 9 in which wings 77 are provided for centring the stem 9 in the cylindrical part 5 of the body 3, and moreover a seat 79 for a sealing O-ring. In this variation, a liquid discharge hole 81 is also present with a drain channel 83, which is coaxial with the cylinder 5 axis, in which such hole 81 performs a safety function in case of inconveniences when spilling the liquid.

Instead, FIGS. 31 to 33 show a second variation of the stem 9, this time made in a single piece with the valve 7, in order to have all characteristics of the standard tap 1, and namely flexible lip seal, guide on the stem and safety trap, and to add the improvements of the valve with O-ring, and namely the central discharge trap. In this variation, open holes 87 are provided which, due to the upper cross-shaped geometry, allow communicating the trap 72 with the safety discharge.

The inventive tap 1 can also be equipped with warranty seal means (not shown) with a known arrangement for this type of taps: such seal means guarantee the tap 1 and the vessel connected thereto from possible tampering. For such purpose, they prevent the operating actuation of the tap 1 when they are present, while, when they are removed (for example through a tear-type opening due to suitable projecting tongues which can be grasped by the user) allow activating the tap 1 and making it operate when opening and closing.

As regards the operating principle of the inventive tap 1, in order to fully understand it, together with the advantages, which can be provided with respect to known taps, it will be necessary to schematically analyse all its possible operating applications.

In case of a tap 1 applied on a rigid vessel without integrated air passage, A' will designate the environment and B' the packaging system (tap 1+vessel): consequently, pa will be the ambient pressure, and pb the pressure inside the vessel.

In this case, liquid would continue to go out of the rigid vessel B' till pb≥pa, while its delivery would be stopped (or anyway would decrease till it stops, when the rigid walls will compensate the vacuum by creating a sort of equilibrium state) when inside the vessel vacuum will start, namely pb<pa.

In case of a tap 1 applied on a rigid vessel without integrated air passage, but without safety valve on the air passage, the air passage starts operating when vacuum starts inside the vessel: therefore, a case could happen in which the vessel is pressurised and therefore makes liquid go out of the air hole. For this reason, so far one was obliged to put the liquid outlet hole in correspondence with the air inlet hole; the same occurred if, when spilling, a pressure was created on the vessel. The inventive valve 26 solves such problem.

Summarising, the inventive tap 1 is able to solve all above mentioned problems, and above all is the only tap which is able to be connected to a connection system (which makes it remain open for large distributions) due to the help of the non-return valve 26.

When the tap is closed, there will be an upper area of the plug in which only air will be present, and the chamber will have a pressure equal to the external environment pressure, namely pa, due to the front venting hole 13 of the tap 1.

The lower part of the tap 1, and naturally all the part of the tap 1 which is connected to the vessel, will be immersed in the liquid: the upper part and the lower part will be kept divided due to the sealing action performed by the internal valve 7 (which is connected to the stem 9) on the internal geometry of the front cylinder 5 of the body 3.

The stem 9 in turn will be connected to the upper member 11, which will provide it with a certain pull and will keep it coupled with the body 3, avoiding liquid to go out.

A further characteristic of the inventive tap 1 is that the whole air intake duct 28 (which is not directly connected to the outside but has an intermediate chamber 25), when the tap 1 is in a closing position, is completely immersed into the liquid.

This condition makes the contained liquid impossible to be dried, and therefore the air duct is always "clean", and the internal ball valve is always well lubricated, upon its use, and above, especially when liquids of the oil or detergent types are used, a situation occurs in which the non-return valve 26 and the internal sealing valve 7 always remain lubricated.

When the tap 1 starts opening (FIGS. 4 and 5), immediately the liquid duct 22, 24 opens, while the air duct 28, due to the above described height X, will remain closed: then, immediately a liquid outlet prevalence will start being created and simultaneously a vacuum will start being created inside the vessel.

Now, as can be seen in FIGS. 6 and 7, going on with the opening stroke, at the end also the air duct 28 will be opened, which immediately will start sucking, due to the vacuum created by the previous action, pulling air inside the vessel (and therefore immediately cleaning the air duct 28 and making the very light-weight and sensitive ball 32 go back), to try and compensate the pressure difference being created between outside and inside the vessel.

The safety valve 26 will act, for example, in case of a sudden pressure on the vessel, by immediately closing the air duct. It can then be noted that the non-return valve 26 is autonomously managed, due to acting pressures and pressure differences.

When the tap 1 will close, first of all the air duct 28 will close, thereby avoiding possible liquid leaks, and then the liquid duct 22, 24 will close (which always has a greater prevalence also due to its geometric arrangement).

In case, when spilling, part of the liquid goes out, there is, in the internal valve 7, the trap 72, which operates as accumulation tank, thereby providing further warranties of a correct operation, or better still in case of a stem with central discharge as shown in FIG. 33.

The present invention has been shown with reference to some preferred, but not limiting, embodiments: it will be immediately obvious to a skilled person in the art that numerous variations and modifications can be made thereto, which all fall within the scope of the invention as specified in the enclosed claims. For example, the sealing cage-ball-sealing cone assembly can be manufactured as separate object, which can be used also in other taps or applications, which need a valve system which is sensitive to pressure changes.

Figure 37:
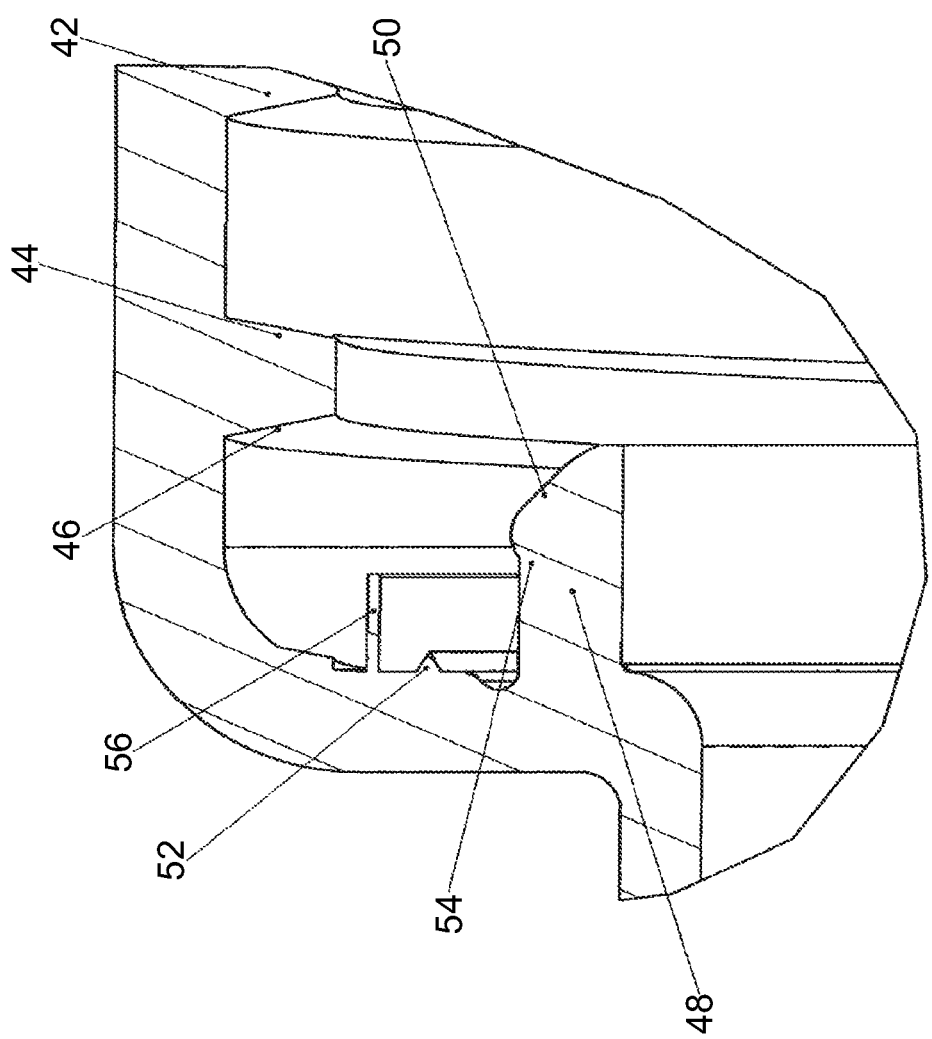
FIG. 37 is a detailed view of the inventive tap, which shows another variation, with triple connection, of the connecting part to a vessel.

Moreover, as shown in FIG. 37, it is possible to realize different sealing combinations between internal sealing cylinder 48, projection 52 and small lip 56: FIG. 37 shows the one in which all three members are present, for realizing a triple seal. All other combinations adapted to realize double seals are obviously possible.

Figure 38:
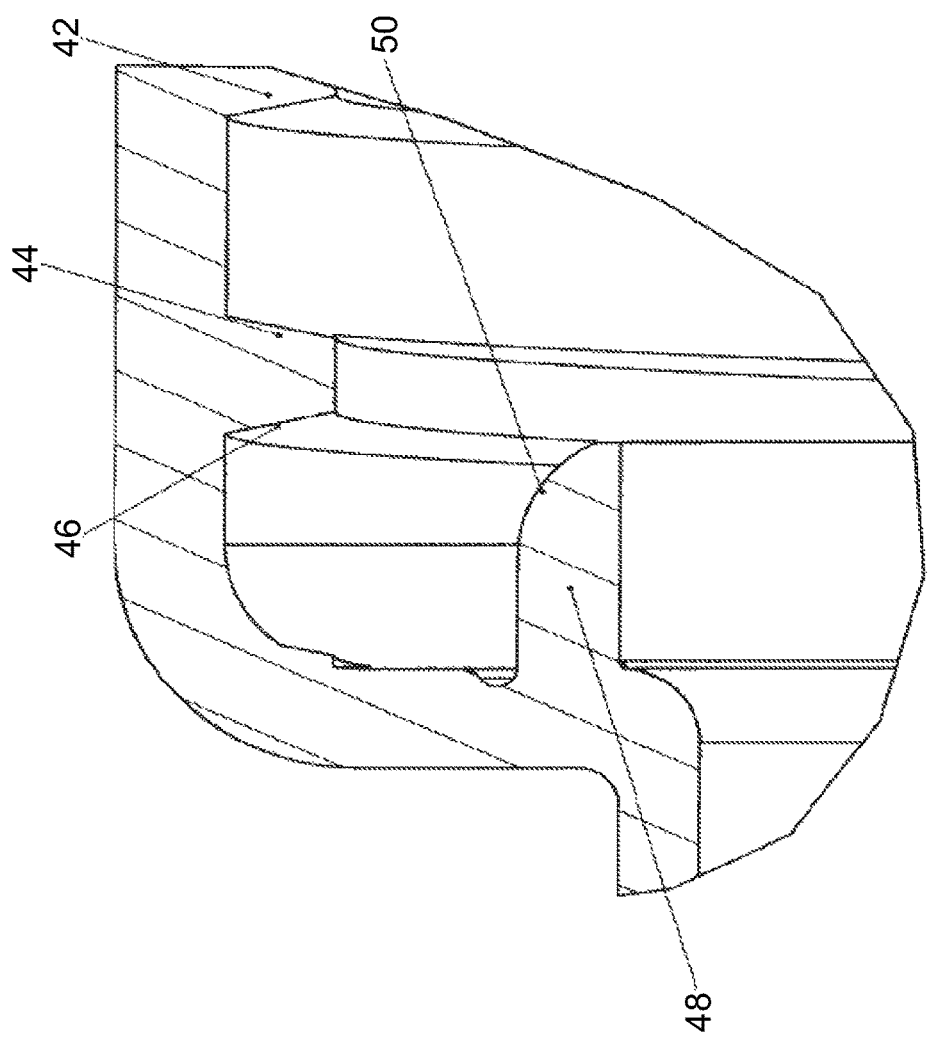
FIG. 38 is a detailed view of a variation of the sealing profile with vessel opening.

As shown in FIG. 38, moreover, it is possible to realise the sealing profile of the sealing cylinder 48 as designated with 50', namely two conical profiles which perform a double, external and internal seal on the vessel neck, in its upper area: the neck realises an interference inside and tends to flex, but finds a small cone on the outside which contains its dilatation and performs a double seal. Also in this case, it will be possible to realise a triple or higher seal by adding other members, such as the above projection 52 and small lip 56, where the small lip 56 is the main seal.

Figure 39:
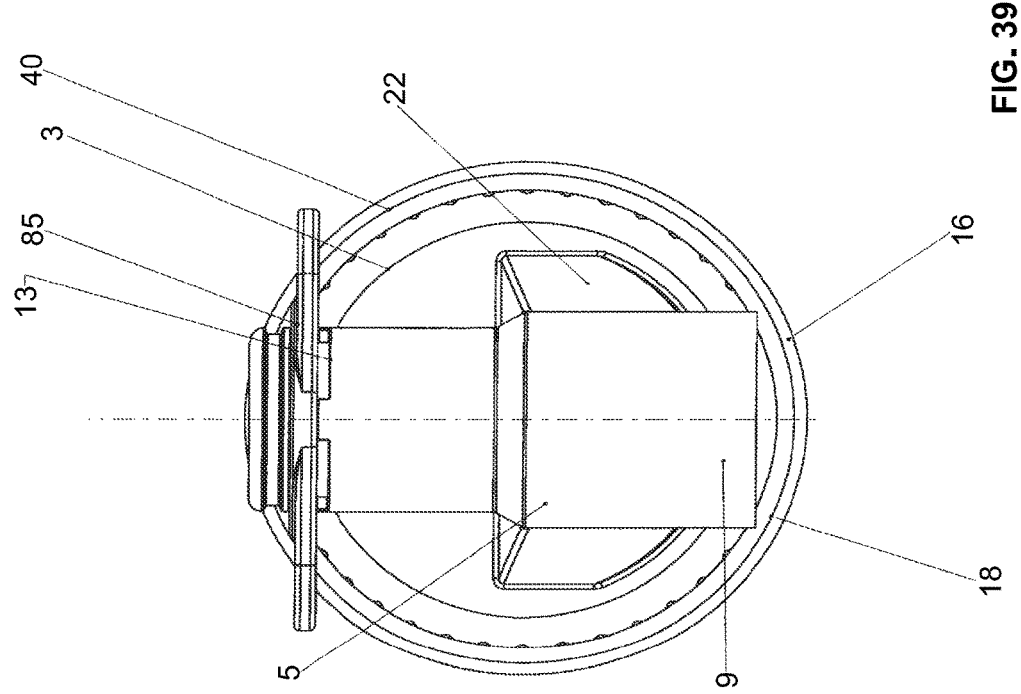
FIG. 39 shows a variation of an embodiment of the inventive tap head, pointing out a variation from the top, instead of on the front, of the air inlet hole.

Moreover, it is possible, as shown in FIG. 39, that the air inlet hole 13 is obtained through a stamping process with crossed male dies: the same process allows obtaining a rounded profile on the body, without necessarily having to realise the small lip, which must therefore be riveted for inserting the internal valve without damaging it. It is also possible to anyway obtain the small lip also with this variation.

Figure 41:
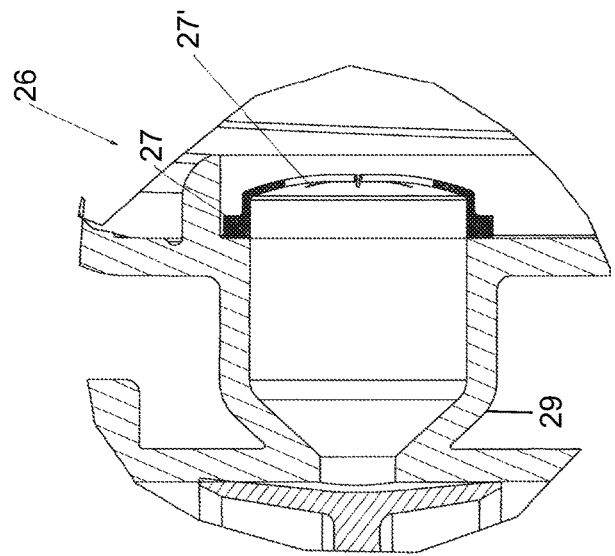
FIG. 41 is a detailed view of the valve in FIG. 40.
Figure 40:
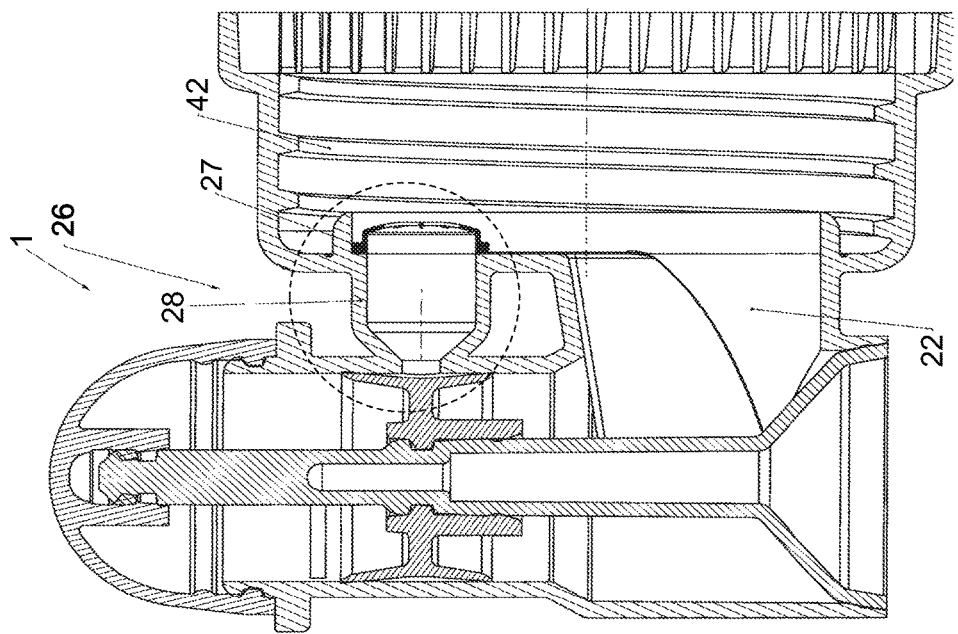
FIG. 40 shows a side sectional view of a variation of the inventive non-return valve.
Figure 42:
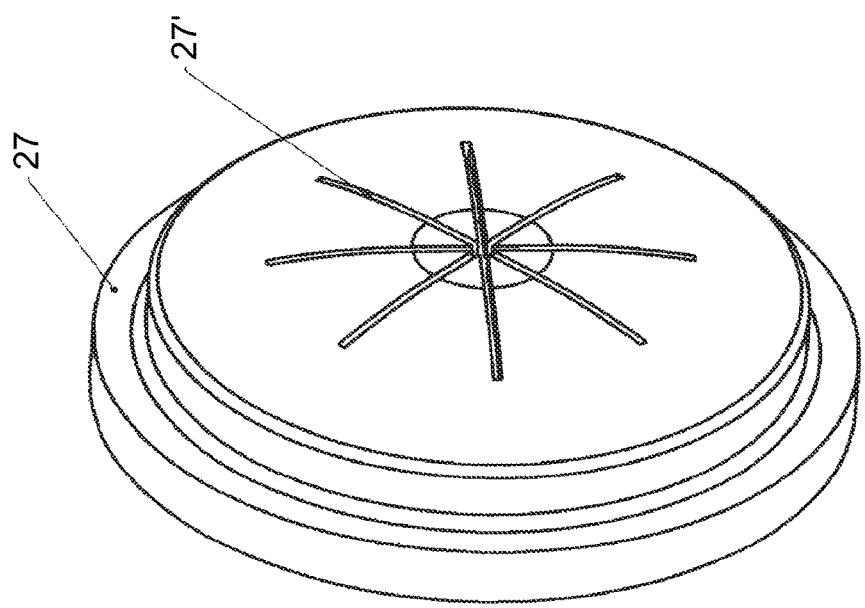
FIG. 42 is a perspective view of the valve in FIG. 40.

Moreover, as shown in FIGS. 40 to 42, it is possible to make the non-return valve 26 shaped as a button 27 with star-type opening 27': such valve 27 is made of silicone, which is the only material which provides the chance of cutting the piece after stamping, namely of creating the star 27' edges so that they accurately seal one against the other. The valve 27 can be ultrasound, hot or laser welded; in addition, it will be possible to restrain it, by creating a restraint geometry on the body or by adding another piece for restraining.

Figure 45:
FIG. 45 is a perspective view of the valve in FIG. 43.
Figure 53:
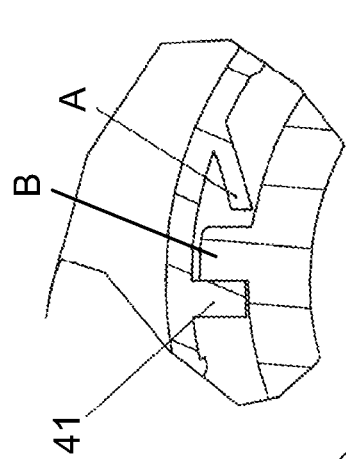
FIGS. 50, 51, 52 and 53 are a side view, a front view, a sectional view and a detailed view of the two small flexible lips of the inventive tap.
Figure 52:
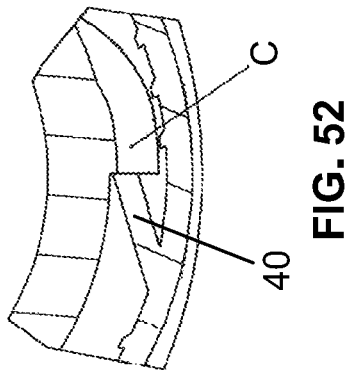

Finally, as shown in FIGS. 43 to 45, it is possible to realise the non-return valve 27 with a "funnel" or "mushroom" geometry 31 or with a "small lip": in this case, in addition to providing an adequate seat for the valve 31, it is possible to provide such seat with a small lip profile 31' next to the sealing cone, in order to solve the problem of shrinkage of the area in which the small teeth 30 are attached. Obviously, as regards the geometry 31, modifications (not shown) will have to be performed on the body, or a piece (not shown) will have to be added to provide an end-of-stroke to the mushroom geometry.

Figure 51:
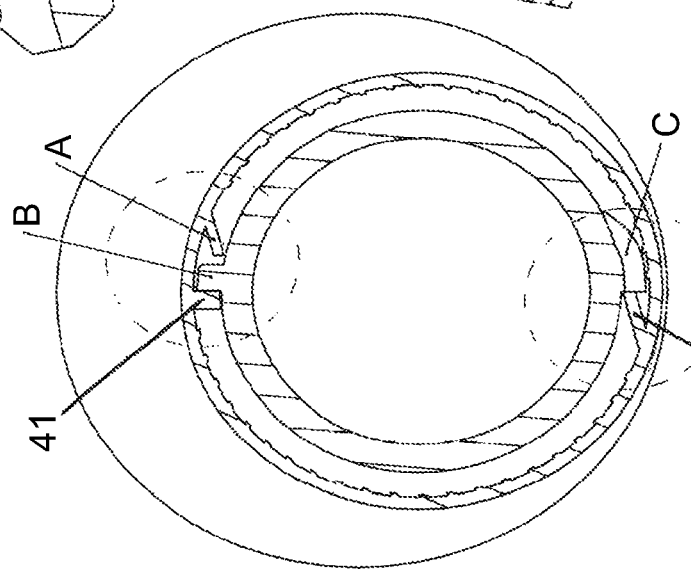
Figure 50:
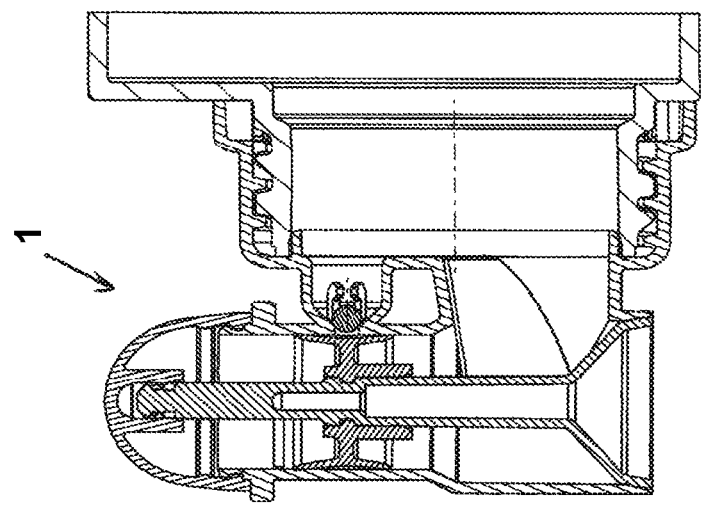
Figure 54:
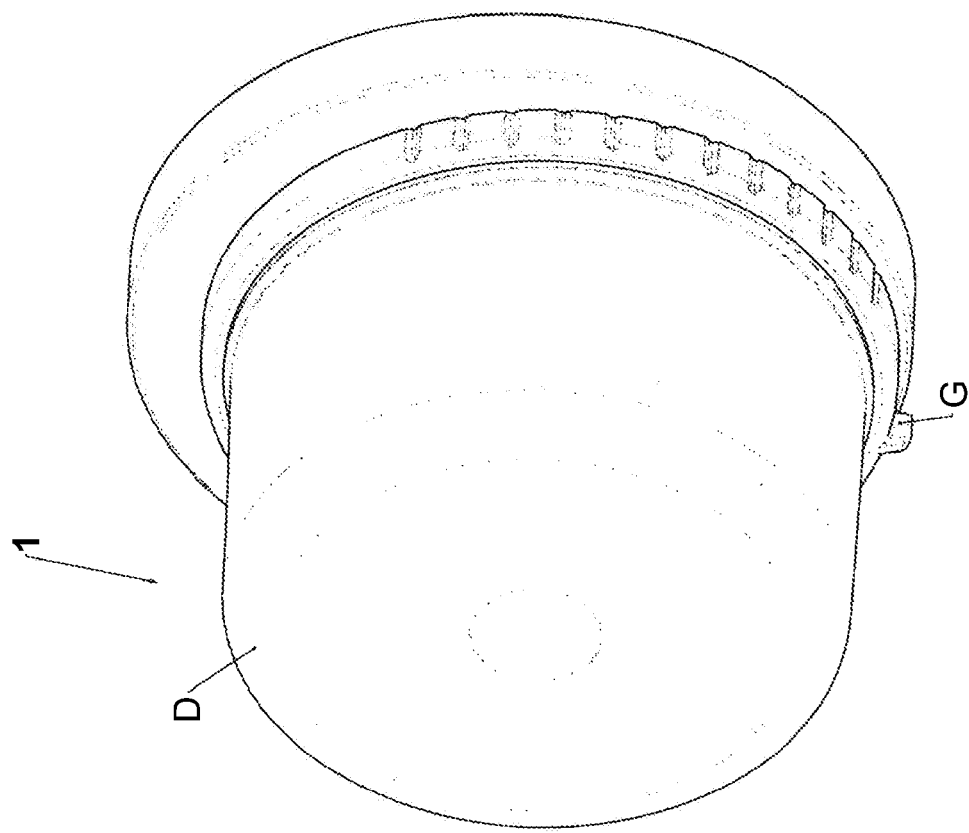
FIGS. 54 and 55 shows the sectional view and the perspective view of the inventive tap in its version with integrated batching glass and children-protecting arrangement.
Figure 55:
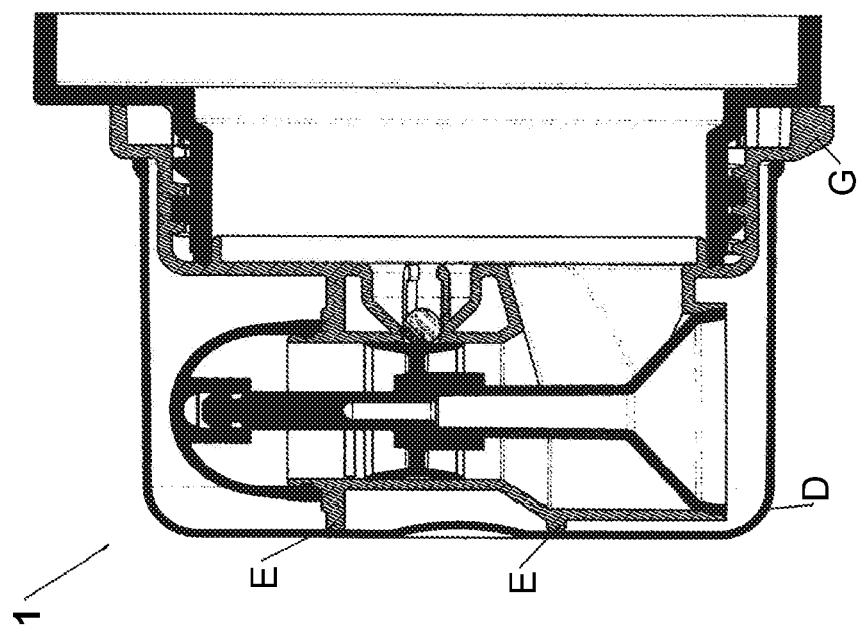

Nowadays, as previously stated, there is, on the inventive tap 1, only one flexible lip which, by cooperating with the standard neck geometries "B" and "C" shown in FIG. 51, generates their correct assembling/orienting, and its correct placement on the plastic vessel. The current market, however, requires that the tap is not removable from the vessel once applied thereon, due to two main reasons (especially if there is a single liquid outlet mouth and therefore there is not a second venting tap):

1. safeguard of the company image which must be protected from counterfeiting. If for example a company sells detergents, it must be sure that, at the end of its use, the tap is not removed and the vessel is not filled with poor liquids and then put again on the market;
2. the other problem deals with safety: the market requires safety technologies as children protection so that, especially if the vessel contains dangerous liquids for human health if ingested (for example detergents), the vessel has a tap which is difficult to remove unless it is broken. This guarantees an extreme safety against the possible ingestion by a child.

Obviously, the market requires that these technologies are obtained on the tap. The neck which is usually marketed (the most common one above all in America, but also in Europe) is the 33-mm neck.

Object of the present invention is obtaining anti-counterfeiting and children-protecting arrangements on its inventive tap 1, which exploit as fastening the standard neck geometries present on the market, without requiring costly modifications for a customer.

Another object of this implementation of the inventive tap is creating a tap which allows facilitating and making cheap assembling the batching glass (which however is also used as support when storing) on the tap.

Another object of this implementation of the inventive tap is also creating a tap with supporting means integrated in the main body, directly obtained through moulding, which will abut onto the internal surface of the batching glass, which however will be integrated in the tap itself and not any more a standalone piece, as occurs in vessels currently on the market. In this way, being an integrated piece, an assembling step will be removed (the glass being integrated onto the tap will be assembled on the vessel in the same step of assembling the tap) saving time and money, and simplifying the method for producing the finished vessel, making the cycle cheaper and more immediate.

With reference to FIGS. 27 to 33, the various arrangements which makes it possible to obtain the above objects required by the market will now be described.

Taking into account the most common neck geometry on the market (33-mm neck as shown in FIGS. 48 and 49), useful arrangements can be noted for fastening the anti-counterfeiting and children-protecting system which will be created on the body of the inventive tap 1.

In detail, in FIG. 48, one can see the first engaging element B with anti-counterfeiting and children-protecting function, and the second engaging element C with anti-counterfeiting and children-protecting function, which, in the standard version, operate with a plane obtained on the tap body of FIG. 8 (reference 41) and determine its correct positioning on the vessel, while a first small flexible lip 40 of FIG. 5 determines its blocking.

The problem is that such first small flexible lip 40 is very fragile and allows removing the tap 1 without particular problems.

Therefore, it has been devised to keep this arrangement 40, but also to double its hold by adding a third engaging element A with anti-counterfeiting and children-protecting function, shaped as a second small flexible lip at 180° from the first small lip, in order to be able to engage the external side of the first engaging element B, generating a combination of foces which, when summed, make it impossible (or anyway particularly difficult without breaking the "tap system") to remove the tap 1 itself from the vessel, thereby obtaining the desired anti-counterfeiting and children-protecting functions.

As regards the second technologic innovation which implies benefits in terms of assembling times and generic complexity of the assembling machine, it is obtained by integrating the batching glass D onto the body and by creating on the body itself structural ribs adapted to cooperate with the internal walls of the integrated batching glass D in order to have an area which allows a plane support also in the area where the tap 1 will be placed, and where usually also the vessel handle has its seat.

Figure 58:
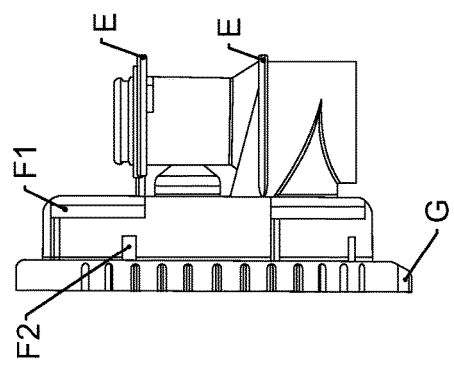
Figure 64:
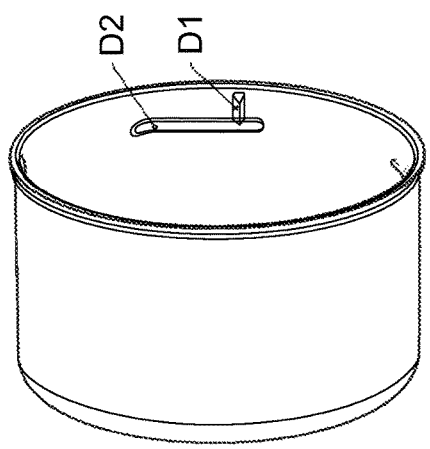
Figure 61:
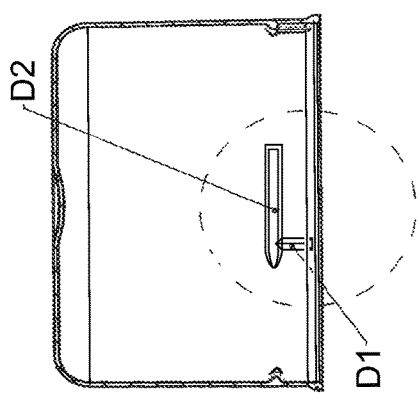
Figure 63:
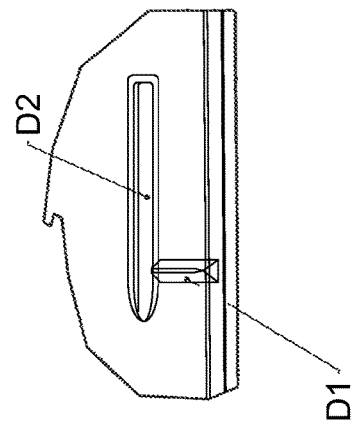

The glass D will have first connecting means D1 and D2 (FIGS. 61, 63 and 64) adapted to cooperate with second connecting means F1 and F2 present on the body (FIG. 58), being housed on the tap body 1.

Figure 57:
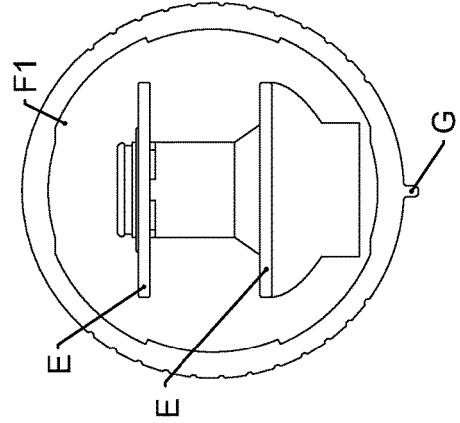
Figure 60:
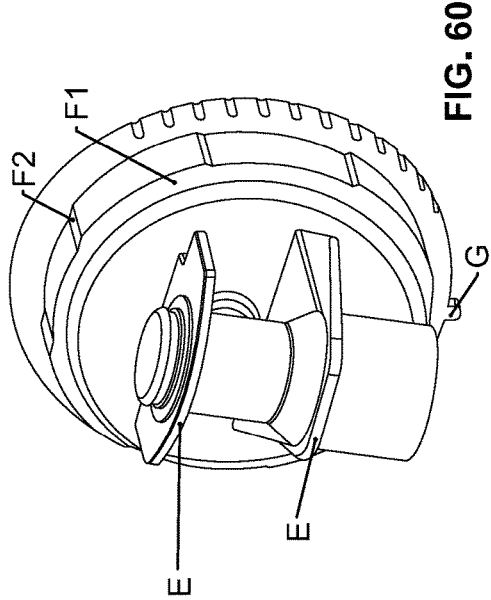
Figure 62:
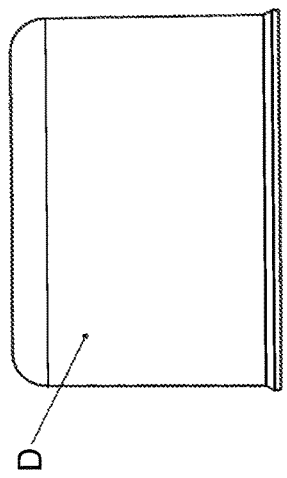
FIGS. 61, 62, 63 and 64 shows the side sectional, side, detailed and perspective views of the integrated glass "D".

On the same tap body 1, supporting elements E (FIGS. 57 and 58) are also obtained, adapted to support a plurality of taps 1 stacked when transporting and storing them.

Figure 59:
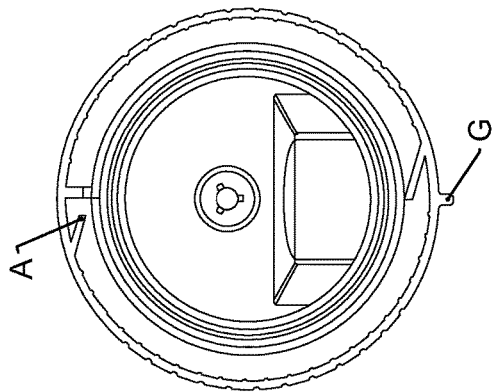
FIGS. 57, 58, 59 and 60 shows the front, side, rear and perspective views of the tap body of FIG. 55.

Finally, means G for orienting the glass B (FIG. 59) will also be obtained on the body of the inventive tap 1.

The invention claimed is:

1. A tap for delivering liquid, the tap comprising:
a body equipped with a connection part to a vessel of liquid to be delivered and with a liquid delivering passage, the connection part including an internal sealing cylinder, and the body including an air chamber;
stem means adapted to open and close the liquid delivering passage;
elastic actuating means adapted to actuate said stem means in their delivery opening and closing positions;
air inlet and outlet means in the body and inside the vessel;
valve means adapted to open and close an air passage in said air inlet and outlet means;
an air duct placed in said body between said internal sealing cylinder of the connection part and said air chamber;
non-return valve means placed in said body between said air inlet and outlet means and a vessel interior, and said non-return valve means placed entirely upstream of the internal sealing cylinder, said non-return valve means being adapted to be guided and driven by a pressure difference between outside the tap and inside the vessel;
a first engaging element with anti-counterfeiting and protecting function;
a second engaging element with anti-counterfeiting and protecting function, adapted to operate with a plane obtained on the body to determine a correct positioning of the tap on the vessel;
a first small flexible lip adapted to block the tap; and
a third engaging element with anti-counterfeiting and protecting function, shaped as a second small flexible lip at 180° from the first small lip, adapted to engage an external side of the first engaging element, generating a combination of forces which performs the anti-counterfeiting and protecting function.

2. The tap according to claim 1, comprising a batching glass integrated on the body and with structural ribs obtained on the body, adapted to cooperate with internal walls of the integrated batching glass in order to have an area which allows a plane support also in the area where the tap will be placed.

3. The tap according to claim 2, comprising means for orienting the batching glass.

4. The tab according to claim 1, wherein:
said body is made in a single piece made of plastic material, on which a front cylinder is obtained where said valve means slides, said valve means being operatively coupled with said stem means, said stem means being operatively coupled with said elastic actuating means; and
said cylinder for sliding said valve means is equipped with a small lip in its upper part, namely in its part adapted to receive by restraint said elastic actuating member, said small lip being adapted to be bent, mechanically or on a die, in order to create a starting point for assembling said valve means.

5. The tap according to claim 1, wherein:
a lower part of the body is internally shaped with a profile having a slanted wall, said lower part being adapted to be coupled for realising a liquid seal with a lower part of said stem means, said lower part being made with a self-centring frustum-of-cone geometry; and
an external surface of said lower part of said stem means is smooth and is adapted to seal with a circular protuberance with which said lower part of said body is internally equipped.

6. The tap according to claim 1, wherein a cylinder for sliding said valve means is adapted to be operatively connected to said elastic actuating means through stamping.

7. The tap according to claim 1, wherein a cross section of said liquid delivering passage is much greater that a cross section of said air inlet and outlet means, said passage being equipped with downward slanted walls adapted to facilitate conveying and delivering of the liquid.

8. The tap according to claim 1, wherein:
said air inlet and outlet means are composed of an air hole obtained on a front cylinder of said body, the air chamber obtained in said front cylinder of said body, and the air duct adapted to connect said front cylinder to the vessel interior;
a distance between an axis of said air hole and an axis of said air duct is adapted to obtain an opening delay of said air hole with respect to a lower liquid delivering part in order to create a liquid prevalence and a vacuum inside the vessel, said vacuum being adapted to actuate said non-return valve means;

said air hole is adapted to be obtained through a stamping process with crossed male dies; and said air duct ends with a cone-shaped profile in order to realise a seal with a ball of which said non-return valve means is composed, said non-return valve means including a plurality of small teeth adapted to contain said ball inside.

9. The tap according to claim 8, wherein:

said small teeth are made with a chamfered end as starting point adapted to facilitate an insertion of said ball inside said small teeth, said small teeth being then adapted to allow moving said ball inside between an opening and a closing position of an air flow;

said chamfered end is further equipped with a stop edge adapted to keep said ball once having inserted it between said small teeth;

said small teeth are made of elastic material in order to insert said ball therein when manufacturing said non-return valve means is complete;

said small teeth are made as straight small teeth, adapted to be hot riveted or mechanically bent after having inserted said ball therein; and the small teeth of said non-return valve means are placed in a slanted position with respect to an axis of said tap, said non-return valve means, in its rest position, being adapted to always have said ball in a closing position against a cone-shaped sealing geometry obtained on said body.

10. The tap according to claim 1, wherein said non-return valve means is equipped with a stem, a mushroom, or a membrane adapted to operate to perform opening and closing of said non-return valve means.

11. The tap according to claim 1, wherein:

said body is equipped with a part adapted to come in contact with the liquid vessel and perform a seal with the vessel, said part being equipped with at least one reference member adapted to correctly place said tap on the vessel; and said part is equipped with a threading composed of a thread with a support of two geometries adapted to cooperate with other geometries being present on the vessel.

12. The tap according to claim 11, wherein:

said part is equipped with the internal sealing cylinder equipped with a starting surface, said sealing cylinder also cooperating with at least one triangular concentric projection, said cylinder being adapted to engage a vessel neck and said projection being adapted to push on a vessel neck nose;

the internal sealing cylinder is equipped with a sealing protuberance, said protuberance being adapted to be geometrically conformed in order to be flexed in contact with the vessel neck and to be adapted to vessels with different sizes;

said part is further equipped with a thin small lip, said small lip being adapted to be fitted outside the vessel neck, increasing the seal;

the sealing cylinder is equipped with an enlargement in its upper part and being thereby adapted to perform a simple interference with the vessel neck;

said part is equipped with at least one threading sector adapted to allow the tap to rotate around the vessel neck and to be operatively engaged with the vessel neck once having reached a desired operating position; and said internal sealing cylinder includes a profile obtained through two cone-shaped profiles, adapted to perform a double, external and internal seal on the vessel neck.

13. The tap according to claim 1, wherein said non-return valve means is shaped as a button with a star-type opening, or a funnel or mushroom-shaped geometry.

14. The tap according to claim 13, wherein said non-return valve means is further equipped with a small lip profile next to a sealing cone, in order to solve the problem of shrinking in areas where small teeth are attached.

15. The tap according to claim 1, wherein:

an internal valve is stamped in a semi-rigid material adapted to provide said internal valve simultaneously with stiffness and flexibility requirements in some of its points;

said internal valve is equipped with an upper flexible lip, adapted to compensate for possible not axial movements of said stem means and adapted to always provide a desired "pull" in a sealing area;

said internal valve is equipped with a lower flexible lip, adapted to compensate and dampen possible not axial movements, said lower lip operating as self-centring member for said stem means during their sliding;

an external area of said internal valve is equipped with a self-lubricating hollow space and a sealing area adapted to cooperate with said body in its cylindrical part;

said internal valve is equipped with a starting chamfer in a engagement area with said stem means for centring on said stem means, with a sealing projection on said stem means and with a clamping projection adapted to allow clamping between stem means and the internal valve; and said internal valve is equipped with a safety trap adapted to keep possible material leaks.

16. The tap according to claim 1, wherein said elastic actuating means are equipped with clamping means with said stem means, equipped with at least one clamping projection which is adapted to engage a corresponding recess obtained in an upper part of said stem means, said elastic actuating means being further equipped with sealing means on said body, said sealing means being composed of a geometry adapted to engage a corresponding sealing recess obtained outside a cylinder of said body.

17. The tap according to claim 1, wherein:

said stem means are equipped with an elongated body, which ends at one end with a sealing tooth with said elastic actuating member and at an opposite end with a self-centring frustum-of-cone part, said elongated body being equipped with a sealing seat with said valve means, said sealing seat being composed of a tooth and a recess, in addition to a liquid sealing area which cooperates with the lower part of said valve means;

said stem means are equipped with wings for centring said stem means in said cylinder of said body, and further with a seat for a sealing O-ring, said stem means being further equipped with a liquid discharge hole with a drain channel which is coaxial to an axis of said cylinder; and said stem means are made in a single piece with said valve means, said stem means being equipped with open holes adapted to communicate a trap with a safety discharge.

18. A tap configured to be connected to a vessel containing liquid, the vessel including a vessel interior, the tap comprising:

a body including a connection part with a liquid delivering passage, the connection part including an internal sealing cylinder, and the body including an air chamber;

a stem adapted to open and close the liquid delivering passage;

an actuating member adapted to actuate the stem to a delivery opening position or a delivery closing position;

an air hole in the body;

a valve adapted to open and close an air passage in the air hole;

an air duct disposed in the body between the internal sealing cylinder of the connection part and the air chamber;

a non-return valve in the body disposed between the air hole and the vessel interior, and the non-return valve disposed entirely upstream of the internal sealing chamber, the non-return valve being adapted to be guided and driven by a pressure difference between outside the tap and inside the vessel;

a first engaging element;

a second engaging element adapted to operate with a plane obtained on the body to determine a correct positioning of the tap on the vessel;

a first small flexible lip adapted to block the tap; and a third engaging element shaped as a second small flexible lip, the third engaging element adapted to engage an external side of the first engaging element to generate a combination of forces which perform an anti-counterfeiting and protecting function.

19. A system for delivering liquid, comprising:

a vessel including a vessel interior adapted to contain a liquid; and a tap including:

a body including a connection part with a liquid delivering passage adapted to connect to the vessel, the connection part including an internal sealing cylinder, and the body including an air chamber;

a stem adapted to open and close the liquid delivering passage;

an actuating member adapted to actuate the stem to a delivery opening position or a delivery closing position;

an air hole in the body;

a valve adapted to open and close an air passage in the air hole;

an air duct disposed in the body between the internal sealing cylinder of the connection part and the air chamber;

a non-return valve in the body disposed between the air hole and the vessel interior, and the non-return valve disposed entirely upstream of the internal sealing cylinder, the non-return valve being adapted to be guided and driven by a pressure difference between outside the tap and inside the vessel;

a first engaging element;

a second engaging element adapted to operate with a plane obtained on the body to determine a correct positioning of the tap on the vessel;

a first small flexible lip adapted to block the tap; and a third engaging element shaped as a second small flexible lip, the third engaging element adapted to engage an external side of the first engaging element to generate a combination of forces which perform an anti-counterfeiting and protecting function.

* * * * *